(12) United States Patent
Wang et al.

(10) Patent No.: US 12,021,382 B2
(45) Date of Patent: Jun. 25, 2024

(54) PHOTOVOLTAIC ENERGY STORAGE POWER STATION

(71) Applicants: Quanling Wang, Qinhuangdao (CN); Miaohong Wang, Qinhuangdao (CN)

(72) Inventors: Quanling Wang, Qinhuangdao (CN); Miaohong Wang, Qinhuangdao (CN)

( * ) Notice: Subject to any disclaimer, the term of this patent is extended or adjusted under 35 U.S.C. 154(b) by 0 days.

(21) Appl. No.: 18/505,904

(22) Filed: Nov. 9, 2023

(65) Prior Publication Data

US 2024/0079903 A1  Mar. 7, 2024

Related U.S. Application Data

(63) Continuation of application No. PCT/CN2022/092018, filed on May 10, 2022.

(30) Foreign Application Priority Data

May 12, 2021 (CN) .......................... 202110517433.4

(51) Int. Cl.
*H02J 15/00* (2006.01)
*F28D 20/00* (2006.01)
(Continued)

(52) U.S. Cl.
CPC .......... *H02J 15/00* (2013.01); *F28D 20/0034* (2013.01); *F28D 20/021* (2013.01); *H02J 3/322* (2020.01); *F28D 2020/0078* (2013.01); *F28D 2020/0082* (2013.01); *H02J 13/00024* (2020.01); *H02J 13/00026* (2020.01);
(Continued)

(58) Field of Classification Search
CPC ...... H02J 15/00; H02J 3/322; H02J 13/00026; H02J 2300/28; H02J 2300/40; H02J 2300/24; H02J 13/00024; F28D 20/0034; F28D 20/021; F28D 2020/0078; F28D 2020/0082

See application file for complete search history.

(56) References Cited

U.S. PATENT DOCUMENTS 10,012,113 B2 * 7/2018 Vamvas ................. F28D 20/02
2020/0343833 A1 * 10/2020 Weber ..................... H02J 3/381
(Continued)

FOREIGN PATENT DOCUMENTS

CN           102052256 A    5/2011
CN           106786760 A    5/2017
(Continued)

OTHER PUBLICATIONS

Internation Search Report of PCT/CN2022/092018, Mailed Jul. 27, 2022.

*Primary Examiner* — Carlos Amaya

(57) ABSTRACT

A photovoltaic energy storage power station comprises a wind and photovoltaic power grid and an electric energy storage apparatus; the wind and photovoltaic power grid generates electricity by wind and photovoltaic power and is integrated into a public grid system; and an input end of the electric energy storage apparatus is connected to the wind and photovoltaic power grid, absorbs electric energy of the wind and photovoltaic power grid as needed by using the electric energy storage apparatus, and stores the electric energy in an energy storage mode, and an output end of the electric energy storage apparatus supplies the stored energy to a user.

17 Claims, 37 Drawing Sheets

(51) Int. Cl.
  *F28D 20/02*    (2006.01)
  *H02J 3/32*     (2006.01)
  *H02J 13/00*    (2006.01)
(52) U.S. Cl.
  CPC ....... *H02J 2300/24* (2020.01); *H02J 2300/28* (2020.01); *H02J 2300/40* (2020.01)

(56) References Cited

U.S. PATENT DOCUMENTS

2020/0386447 A1* 12/2020 Wang ..................... F24F 5/005
2021/0215438 A1*  7/2021 Griffith ............... F28D 20/0034

FOREIGN PATENT DOCUMENTS

| CN | 111964196 A   | 11/2020 |
| CN | 216959714 U   | 7/2022  |
| WO | 2009016113 A1 | 2/2009  |

\* cited by examiner

| FIG. 13A | FIG. 13B |

FIG. 13

| FIG. 14A | FIG. 14B | FIG. 14C |

FIG. 14

| FIG. 15A | FIG. 15B | FIG. 15C |

FIG. 15

| FIG. 16A | FIG. 16B | FIG. 16C |

FIG. 16

| FIG. 17A | FIG. 17B | FIG. 17C |

FIG. 17

| FIG. 18A | FIG. 18B | FIG. 18C |

FIG. 18

| FIG. 19A | FIG. 19B |

FIG. 19

PHOTOVOLTAIC ENERGY STORAGE POWER STATION

CROSS-REFERENCE TO RELATED APPLICATIONS

The present application claims the priority of the Chinese patent application filed on May 12, 2021 with the application number of 202110517433.4 and the title of "PHOTOVOLTAIC ENERGY STORAGE POWER STATION", which is incorporated herein in its entirety by reference.

TECHNICAL FIELD

The present application relates to the technical field of green energy power generation and energy storage devices, and in particular, to a photovoltaic energy storage power station.

BACKGROUND OF THE PRESENT INVENTION

With the implementation of the global goals of carbon neutrality and peak carbon dioxide emissions, all countries in the world are vigorously developing photovoltaic and wind power generation, and some countries have reached a crazy level. However, recently wind power generation has been regarded as garbage power internationally.

Scientists have found that wind power generation affects the climate, because wind power will cause a lot of wind forces to stay in nature. Without enough air circulation, the surrounding temperature will rise, and the temperature difference between distant areas will increase. Huge impellers of wind power generation affect the activities of human beings and birds, and the birds even die under the impellers. Huge noises caused by the friction between the impellers and the air have caused strong resentment among surrounding residents. The above reasons are the real reasons why the wind power is called "garbage power" in the wind power industry, and the international voice of abandoning wind is getting louder and louder. Although the wind power generation is clean energy, it is indeed veritable "garbage power".

Photovoltaic and wind power generation have two characteristics: one is the randomness of output; and the other is a reverse peak regulation characteristic. In other words, the size of photovoltaic and wind power generation is uncontrolled, and is sometimes large and sometimes small. Moreover, the power generation is often not enough when electricity is used, but is fierce when the electricity is not used. For example, there is often no wind at noon. However, when resting in the early morning, due to the strong wind, there is a surplus of wind power. Photovoltaic power generation also has similar problems. During the peak hours of power consumption in a factory in the morning or afternoon, due to insufficient sunlight, a photovoltaic power generation capacity is small, and when there is plenty of sunshine at noon, the factory does not need electricity at all during lunch break. In the evening and at night, residents use electricity at the peak. However, as there is no sunlight, photovoltaic power generation has a complete rest. Therefore, the characteristics of photovoltaic power generation are completely contrary to human needs, which lead to the reluctance of power systems to accept photovoltaic power generation grid connection.

In view of the above problems, and with the trend of abandoning electricity, the energy storage industry has risen under the background of "carbon neutrality". It is necessary to store uncontrolled wind and photovoltaic energy by batteries and release electric energy when people need the electric energy. Therefore, the wind and photovoltaic energy storage industry has been vigorously developed. In the context of peak carbon dioxide emissions in 2020, 1.56 GW of electrochemical energy storage were newly installed in China in 2020, and reached 3269.2 MW by the end of 2020. In 2025, the installed capacity will be 9 times that of 2020, and the wind and photovoltaic energy storage industry has broad prospects.

Green energy power generation is inseparable from batteries. However, battery explosion accidents are frequent. In the past decade, there have been 32 fire and explosion accidents in energy storage power stations around the world. Recently, the explosion of Beijing Guoxuan Fuweisi integrated optical storage and charging power station stopped the booming energy storage power station. The implementation of energy storage in a large area in a city is an important event for the government to save energy and reduce emissions, but there are also great security risks. Storage batteries are distributed and stored in a whole container and arranged on a user side in downtown areas, just like putting a giant bomb in the crowd, and there may be a hidden danger of explosion at some time. Because the current battery energy storage technology has not passed the global standards, the world is exploring and applying the current battery energy storage technology. The painful lesson calls for cutting-edge technology to develop safe and reliable energy storage batteries, while also looking forward to the research and development of safe and reliable energy storage alternative technologies, which is now in front of global technology workers.

In addition to the risk of explosion, the severity and destructiveness of toxic and harmful emissions from the production process of batteries into the atmosphere and the environment far outweigh the environmental significance that green energy generation brings to humanity. In particular, there is no way to eliminate and recycle finished batteries, which leads to the fact that developed countries do not produce batteries at all, and all of them are transferred to developing countries, especially the battery manufacturers in China are very prosperous. In fact, a number of batteries scrapped for the development of wind and photovoltaic energy storage are stored for a long time and cannot be recycled, and the environmental risks of the wind and photovoltaic power generation are far greater than the benefits of the wind and photovoltaic power generation, in other words, the disadvantages outweigh the benefits.

If a power charging and storage mode is changed into an energy storage mode to absorb green energy resources for power storage and utilization, then a pain point of photovoltaic battery explosion can be solved by safe and reliable energy storage technology.

Household energy storage of valley power not only solves the grid-connected utilization of the wind and photovoltaic power generation, but also provides users with a cold source for a refrigeration air conditioner, and sales of heat energy for heating, which has become a one-stop development mode. This photovoltaic energy storage power station is an innovation that integrates upstream photovoltaic power generation and energy storage and downstream sales of energy, eliminates the hidden danger of battery explosion, eliminates the pain point of power grids unwilling to accept new energy power, and taps a potential mode of new energy power generation.

SUMMARY OF THE PRESENT INVENTION

The objective of the present application is to provide a photovoltaic energy storage power station, which can solve the problem of poor power storage safety in the prior art.

The present application provides a photovoltaic energy storage power station, comprising a wind and photovoltaic power grid 1 and an electric energy storage apparatus 2;
the wind and photovoltaic power grid 1 generates electricity by wind and photovoltaic power and is integrated into a public grid system; and
an input end of the electric energy storage apparatus 2 is connected to the wind and photovoltaic power grid 1, absorbs electric energy of the wind and photovoltaic power grid 1 as needed by using the electric energy storage apparatus 2, and stores the electric energy in an energy storage mode, and an output end of the electric energy storage apparatus 2 supplies the stored energy to a user.

In one embodiment, the photovoltaic energy storage power station further comprises a heating air-conditioning system 4, a charging pile 5, and a light and/or load 6;
the wind and photovoltaic power grid 1 is connected to the charging pile 5 and an input end of the light and/or load 6;
the output end of the electric energy storage apparatus 2 is connected to an input end of the heating air-conditioning system 4;
the heating air-conditioning system 4 comprises a heating system, a domestic hot water system and a bathing system;
the charging pile 5 comprises a new energy vehicle and electric vehicle charging pile; and
the light and/or load 6 comprises an indoor and outdoor lighting system and a power system utilization terminal.

In one embodiment, the electric energy storage apparatus 2 comprises a phase-change heat storage apparatus 7;
the phase-change heat storage apparatus 7 comprises a phase-change heat storage material 8, at least one set of electric heating apparatuses 9, 10 and 11 and a heating coil heat exchanger 15;
the phase-change heat storage material 8 is stored in the phase-change heat storage apparatus 7, the electric heating apparatuses 9, 10 and 11 are immersed in the phase-change heat storage material 8, and power interfaces A, B and C of the electric heating apparatuses 9, 10 and 11 are connected to the wind and photovoltaic power grid 1; and
the heating coil heat exchanger 15 is immersed in the phase-change heat storage material 8, and coil heat exchanger interfaces 16 and 17 of the heating coil heat exchanger 15 are connected to the heating air-conditioning system 4.

In one embodiment, the electric energy storage apparatus 2 comprises a sensible heat storage apparatus 18;
the sensible heat storage apparatus 18 comprises a sensible heat storage material 19, at least one set of electric heating apparatuses 20, 21 and 22 and a heating coil heat exchanger 23;
the electric heating apparatuses 20, 21 and 22 are immersed in the sensible heat storage material 19, and power interfaces A, B and C of the electric heating apparatuses 20, 21 and 22 are connected to the wind and photovoltaic power grid 1; and
the heating coil heat exchanger 23 is immersed in the sensible heat storage material 19, and coil heat exchanger interfaces 24 and 25 of the sensible heat storage material 19 are connected to a user-side heating and domestic hot water interface.

In one embodiment, the electric energy storage apparatus 2 comprises a sensible heat reservoir 26, a sensible heat storage material 27, at least one set of electric heating apparatuses 28, 29 and 30 and a heating coil heat exchanger 31;
the electric heating apparatuses 28, 29 and 30 are immersed in the sensible heat storage material 27, and power interfaces A, B and C of the electric heating apparatuses 28, 29 and 30 are connected to the wind and photovoltaic power grid 1; and
the heating coil heat exchanger 31 is immersed in the sensible heat storage material 27, and coil heat exchanger interfaces 32 and 33 of the heating coil heat exchanger 31 are connected to the heating air-conditioning system 4.

In one embodiment, the electric energy storage apparatus 2 further comprises the phase-change heat storage apparatus 7, an organic salt 57, a heat-conducting oil or organic solution 58, water 59, a sensible heat storage buffer apparatus 34, a sensible heat storage output apparatus 43, a coupled circulating expansion tank 41, a coupled circulating pump 42, an air-conditioning output circulating pump 52 and the heating air-conditioning system 4;
the phase-change heat storage apparatus 7 comprises a molten salt 57, electric heating apparatuses 9, 10 and 11 and a heating coil heat exchanger 15, the electric heating apparatuses 9, 10 and 11 are immersed in the molten salt 57, and the heating coil heat exchanger 15 is immersed in the molten salt 57;
the sensible heat storage buffer apparatus 34 comprises the heat-conducting oil 58, an input coil heat exchanger 35 and an output coil heat exchanger 38, the input coil heat exchanger 35 is immersed in the heat-conducting oil 58, and the output coil heat exchanger 38 is immersed in the heat-conducting oil 58;
the sensible heat storage output apparatus 43 comprises the water 59, an input coil heat exchanger 44 and an output coil heat exchanger 47, the input coil heat exchanger 44 is immersed in the water 59, and the output coil heat exchanger 47 is immersed in the water 59; and
one end of the heating coil heat exchanger 15 of the phase-change heat storage apparatus 7 is connected to one end of the coupled circulating expansion tank 41 through the interface 16 of the heating coil heat exchanger, the other end of the coupled circulating expansion tank 41 is connected to one end of the input coil heat exchanger 35 of the sensible heat storage buffer apparatus 34 through an interface 36 of the input coil heat exchanger, the other end of the input coil heat exchanger 35 of the sensible heat storage buffer apparatus 34 is connected to one end of the coupled circulating pump 42 through an interface 37 of the input coil heat exchanger, the other end of the coupled circulating pump 42 is connected to the other end of the heating coil heat exchanger 15 through the interface 17 of the heating coil heat exchanger, one end of the output coil heat exchanger 38 is connected to one end of the coupled circulating expansion tank 41 through an interface 39 of the output coil heat exchanger, the other end of the coupled circulating expansion tank 41 is connected to one end of the input coil heat exchanger 44 of the sensible heat storage output apparatus 43 through an interface 45 of the input coil heat exchanger, the other end of the input coil heat exchanger 44 is connected to one end of the coupled circulating pump 42 through an interface 46 of the input coil heat exchanger, the other end of the coupled circulating pump 42 is connected to the other end of the output coil heat exchanger 38 through an interface 40 of the output coil heat exchanger, one end of the output coil heat exchanger 47 of the sensible heat storage output apparatus 43 is respectively connected to one end of the heating air-conditioning system 4 through an interface 48 of the output coil heat exchanger, and the other end of the output coil heat exchanger 47 of the sensible heat storage output tank 43 is connected to the other end of the heating air-conditioning system 4 through the output circulating pump 52.

In one embodiment, the electric energy storage apparatus 2 further comprises the sensible heat storage apparatus 18, the heat-conducting oil 58, the water 59, the sensible heat storage buffer apparatus 34, the sensible heat storage output apparatus 43, the coupled circulating expansion tank 41, the coupled circulating pump 42, the air-conditioning output circulating pump 52 and the heating air-conditioning system 4;

one end of the heating coil heat exchanger 23 of the sensible heat storage apparatus 18 is connected to one end of the coupled circulating expansion tank 41 through the interface 24 of the heating coil heat exchanger, the other end of the coupled circulating expansion tank 41 is connected to one end of the input coil heat exchanger 35 through the interface 36 of the input coil heat exchanger, the other end of the input coil heat exchanger 35 is connected to one end of the coupled circulating pump 42 through the interface 37 of the input coil heat exchanger, and the other end of the coupled circulating pump 42 is connected to the other end of the heating coil heat exchanger 23 through the interface 25 of the heating coil heat exchanger; and one end of the output coil heat exchanger 38 of the sensible heat storage buffer apparatus 34 is connected to one end of the coupled circulating expansion tank 41 through the interface 39 of the output coil heat exchanger, the other end of the coupled circulating expansion tank 41 is connected to one end of the input coil heat exchanger 44 of the sensible heat storage output apparatus 43 through the interface 45 of the input coil heat exchanger, the other end of the input coil heat exchanger 44 is connected to one end of the coupled circulating pump 42 through the interface 46 of the input coil heat exchanger, the other end of the coupled circulating pump 42 is connected to the other end of the output coil heat exchanger 38 through the interface 40 of the output coil heat exchanger, one end of the output coil heat exchanger 47 of the sensible heat storage output apparatus 43 is connected to one end of the heating air-conditioning system 4 through the interface 48 of the output coil heat exchanger, and the other end of the output coil heat exchanger 47 of the sensible heat storage output tank 43 is connected to the other end of the heating air-conditioning system 4 through the output circulating pump 52.

In one embodiment, the electric energy storage apparatus 2 further comprises the sensible heat storage apparatus 26, the water 59, the sensible heat storage output apparatus 43, the coupled circulating expansion tank 50, the coupled circulating pump 51, the air-conditioning output circulating pump 52 and the heating air-conditioning system 4;

one end of the heating coil heat exchanger 31 of the sensible heat storage apparatus 26 is connected to one end of the coupled circulating expansion tank 50 through the interface 32 of the heating coil heat exchanger, the other end of the coupled circulating expansion tank 50 is connected to one end of the input coil heat exchanger 44 of the sensible heat storage output tank 43 through the interface 45 of the input coil heat exchanger, the other end of the input coil heat exchanger 44 is connected to one end of the coupled circulating pump 51 through the interface 46 of the input coil heat exchanger, and the other end of the coupled circulating pump 51 is connected to the other end of the heating coil heat exchanger 31 through the interface 33 of the heating coil heat exchanger; and one end of the output coil heat exchanger 47 of the sensible heat storage output apparatus 43 is connected to one end of the heating air-conditioning system 4 through the interface 48 of the output coil heat exchanger, and the other end of the output coil heat exchanger 47 of the sensible heat storage output tank 43 is connected to the other end of the heating air-conditioning system 4 through the output circulating pump 52.

In one embodiment, the electric energy storage apparatus 2 further comprises a phase-change liquid-air cold storage system;

the phase-change liquid-air cold storage system comprises an air compressor 63, an air reservoir 66, a heat exchange apparatus 69, a heat exchanger 71, an expander 81, a liquid-air reservoir 84, an inner reservoir 85 and liquid-air 88; and an input end of the air compressor 63 is communicated with air, an output end of the air compressor 63 is connected to an input end of the air reservoir 66, an output end of the air reservoir 66 is connected to a subsequent device in two passages, a first passage is connected to one end of a first heat exchange side 72 of the heat exchanger 71 in the heat exchange apparatus 69, the other end of the first heat exchange side 72 is connected to the liquid-air reservoir 84, a second passage is connected to one end of a second heat exchange side 73 of the heat exchanger 71 in the heat exchange apparatus 69, the other end of the second heat exchange side 73 of the heat exchanger 71 is connected to an input end of the expander 81, an output end of the expander 81 is connected to one end of a third heat exchange side 74 of the heat exchanger 71, and the other end of the third heat exchange side 74 of the heat exchanger 71 in the heat exchange apparatus 69 is connected to an input end of the air compressor 63.

In one embodiment, the phase-change liquid-air cold storage system further comprises a heat preservation water tank 90, a liquid-air release heat exchanger 92, chilled water 94, an air discharge port 93, the air-conditioning output circulating pump 52 and the heating air-conditioning system 4;

the chilled water 94 is arranged in the heat preservation water tank 90, the liquid-air release heat exchanger 92 is arranged and immersed in the chilled water 94, one end of the liquid-air release heat exchanger 92 is communicated with the liquid-air 88 in the inner reservoir 85 of the liquid-air reservoir 84 through a throttle valve 89, and one end of the liquid-air release heat exchanger 92 is communicated with the air discharge port 93; and one end of the air-conditioning output circulating pump 52 is connected to the heat preservation water tank 90 and communicated with the chilled water 94, the other end of the air-conditioning output circulating pump 52 is respectively connected to one end of the heating air-conditioning system 4, and the other end of the heating air-conditioning system 4 is connected to the heat preservation water tank 90 and communicated with the chilled water 94.

In one embodiment, the electric energy storage apparatus 2 further comprises an ice storage system;

the ice storage system comprises a refrigeration unit 95, a cooling tower 104, refrigerant circulating pumps 114-1 and 114-2, an ice reservoir 141, an ice-melting frozen water reservoir 207, a cooling water circulating pump 103, an air-conditioning output circulating pump 52 and the heating air-conditioning system 4;

the refrigeration unit 95 comprises a refrigeration compressor 96, a condenser 97, an expansion valve 102 and an evaporator 100;

the cooling tower 104 comprises a tower fan 105, a spraying apparatus 106, an air inlet 107 and cooling water 230, the tower fan 105 is arranged above the spraying apparatus 106, the spraying apparatus 106 is arranged between the tower fan 105 and the air inlet 107, the air inlet 107 is arranged above a liquid level of the cooling water 230, and the cooling water 230 is arranged below the cooling tower 104;

the ice reservoir 141 comprises an ice storage refrigerant heat exchange coil 144, an ice-melting heat exchange coil 146, an ice storage refrigerant circulating tank 112-1 and a refrigerant 113-1, and the refrigerant 113-1 is an anti-freezing solution;

the ice-melting frozen water reservoir 207 comprises a primary heat exchange side 209, a secondary heat exchange side 210, an ice-melting circulating tank 112-2 and a refrigerant 113-2, and the refrigerant 113-2 is an anti-freezing solution; and an air exhaust end of the refrigeration compressor 96 is connected to one end of a refrigerating agent heat exchange side 98 of the condenser 97, the other end of the refrigerating agent heat exchange side 98 of the condenser 97 is connected to one end of a refrigerating agent heat exchange side 264 of the evaporator 100 through the expansion valve 102, the other end of the refrigerating agent heat exchange side 264 of the evaporator 100 is connected to an air suction end of the refrigeration compressor 96, one end of a water heat exchange side 99 of the condenser 97 is connected to the spraying apparatus 106, the other end of the water heat exchange side 99 of the condenser 97 is connected to the cooling tower 104 through the cooling water circulating pump 103, and is communicated with the cooling water 230 in the cooling tower 104, one end of a water heat exchange side 101 of the evaporator 100 is connected to one end of the ice storage refrigerant circulating tank 112-1 and communicated with the refrigerant 113-1, the other end of the ice storage refrigerant circulating tank 112-1 is connected to one end of the ice storage refrigerant heat exchange coil 144, the other end of the ice storage refrigerant heat exchange coil 144 is connected to the other end of the water heat exchange side 101 of the evaporator 100 through the refrigerant circulating pump 114-1, one end of the ice-melting heat exchange coil 146 is connected to one end of the primary heat exchange side 209 of the ice-melting frozen water reservoir 207 through the ice-melting circulating tank 112-2 and communicated with the refrigerant 113-2, the other end of the primary heat exchange side 209 of the ice-melting frozen water reservoir 207 is connected to the other end of the ice-melting heat exchange coil 146 through the refrigerant circulating pump 114-2, one end of the secondary heat exchange side 210 of the ice-melting frozen water reservoir 207 is respectively connected to one end of the heating air-conditioning system 4, and the other end of the heating air-conditioning system 4 is connected to the other end of the secondary heat exchange side 210 of the ice-melting frozen water reservoir 207 through the air-conditioning output circulating pump 52.

In one embodiment, the electric energy storage apparatus 2 further comprises an organic solution cold storage system the heat pump organic solution cold storage system comprises the refrigeration unit 95, the cooling tower 104, an organic solution reservoir 231 and a sodium formate solution 232; and one end of a first heat exchange side 233 in the organic solution reservoir 231 is connected to one end of the water heat exchange side 101 of the evaporator 100 through the coupled circulating tank 41, the other end of the water heat exchange side 101 of the evaporator 100 is connected to the other end of the first heat exchange side 233 in the organic solution reservoir 231 through the coupled circulating pump 42, one end of a second heat exchange side 234 in the organic solution reservoir 231 is respectively connected to one end of the heating air-conditioning system 4 through the air-conditioning output circulating pump 52, and the other end of the heating air-conditioning system 4 is connected to the other end of the second heat exchange side 234 in the organic solution reservoir 231.

In one embodiment, the electric energy storage apparatus 2 further comprises a heat pump ice crystal cold storage/water heat storage system;

the heat pump ice crystal cold storage/water heat storage system comprises a water source heat pump unit 117, an energy tower 147, an energy reservoir 239, the air-conditioning output circulating pump 52 and the heating air-conditioning system 4;

the water source heat pump unit 117 comprises a refrigeration compressor 118, a condenser/evaporator 119, an expansion valve 122, an evaporator/condenser 133 and a four-way reversing valve 123;

the energy tower 147 comprises a tower fan 150, a spraying apparatus 149, an air inlet 151 and an anti-freezing solution/water 148;

the energy reservoir 239 comprises a coil primary heat exchanger 240, a coil secondary heat exchanger 241 and energy storage water 243;

one end of the coil primary heat exchanger 240 in the energy reservoir 239 is connected to one end of the water heat exchange side 120 of the condenser/evaporator 119 through a coupled circulating tank 112; and the other end of the water heat exchange side 120 of the condenser/evaporator 119 is connected to the other end of the coil primary heat exchanger 240 in the energy reservoir 239 through the coupled circulating pump 114, an air exhaust end of the refrigeration compressor 118 of the water source heat pump unit 117 passes through a four-way reversing valve 128 through an interface 124 of the four-way reversing valve and is connected to one end of a refrigerating agent heat exchange side 121 of the condenser/evaporator 119 through an interface 125 of the four-way reversing valve, the other end of the refrigerating agent heat exchange side 121 of the condenser/evaporator 119 is connected to one end of a refrigerating agent heat exchange side 134 of the evaporator/condenser 133 through the expansion valve 122, the other end of the refrigerating agent heat exchange side 134 of the evaporator/condenser 133 passes through a four-way reversing valve 129 through an interface 127 of the four-way reversing valve and is connected to an air suction end of the refrigeration compressor 118 through an interface 126 of the four-way reversing valve, one end of a water heat exchange side 135 of the evaporator/condenser 133 is connected to the spraying apparatus 149 of the energy tower 147, and the other end of the water heat exchange side 135 of the evaporator/condenser 133 is connected to the energy tower 147 through a water source circulating pump 136 and communicated with the anti-freezing solution/water 148 in the energy tower 147.

In one embodiment, the electric energy storage apparatus 2 further comprises a closed energy tower heat pump ice crystal cold storage/water heat storage system;
  the closed energy tower heat pump ice crystal cold storage/water heat storage system further comprises a closed energy tower 154 and a spraying pump 162;
  the closed energy tower 154 comprises a tower spraying pump 162, at least one set of coil heat exchangers 155, a spraying apparatus 157 and an anti-freezing solution/water 165;
  a bottom portion of the closed energy tower 154 is provided with an anti-freezing solution/water reservoir 164, one end of the tower spraying pump 162 is connected to the anti-freezing solution/water reservoir 164 and communicated with the anti-freezing solution/water 165, and the other end of the tower spraying pump 162 is connected to the spraying apparatus 157 and communicated with an anti-freezing solution or water 159 in the spraying apparatus 157; and
  the closed tower fan 158 is arranged a above the spraying apparatus 157, the spraying apparatus 157 is arranged below the closed tower fan 158 and arranged above the coil heat exchanger 155, a lower portion of the coil heat exchanger 155 is arranged at an upper portion of the anti-freezing solution/water reservoir 164 and arranged above a liquid level of the anti-freezing solution/water 165, and air horizontally enters the closed energy tower 154 only through an outer surface of the coil heat exchanger 155 and is exhausted out of the closed energy tower 154 through the closed tower fan 158.

In one embodiment, the electric energy storage apparatus 2 further comprises a closed tower heat pump ice crystal cold storage/water heat storage system;
  the closed energy tower heat pump ice crystal cold storage/water heat storage system further comprises a closed energy tower 171 and the spraying pump 162;
  the closed energy tower 171 comprises the tower spraying pump 162, the anti-freezing solution/water reservoir 164, the coil heat exchanger 172, the spraying apparatus 157, the closed tower fan 158 and a tower filler 173;
  a bottom portion of the closed energy tower 171 is provided with the anti-freezing solution/water reservoir 164, one end of the tower spraying pump 162 is connected to the anti-freezing solution/water reservoir 164 and communicated with the anti-freezing solution/water 165, and the other end of the tower spraying pump 162 is connected to the spraying apparatus 157 and communicated with the anti-freezing solution/water 159 in the spraying apparatus 157; and
  the closed tower fan 158 is arranged at an upper portion of the spraying apparatus 157, the spraying apparatus 157 is arranged between the closed tower fan 158 and the coil heat exchanger 172 and arranged above the coil heat exchanger 172, a lower portion of the coil heat exchanger 172 is arranged at an upper portion of the tower filler 173, a lower portion of the tower filler 173 is arranged at the upper portion of the anti-freezing solution/water reservoir 164 and arranged on above the liquid level of the anti-freezing solution/water 165, and air horizontally enters the closed energy tower 171 only through the tower filler 173 and passes through the coil heat exchanger 172, and is exhausted out of the closed energy tower 171 through the closed tower fan 158, and a low portion of that tower filler 173 is arranged at the upper portion of the anti-freezing solution/water reservoir 164 and arranged above the liquid level of the anti-freezing solution/water 165.

In one embodiment, the electric energy storage apparatus 2 further comprises a primary heat exchange closed energy tower heat pump ice crystal cold storage/water heat storage system;
  the primary heat exchange closed energy tower heat pump ice crystal cold storage/water heat storage system comprises a heat pump unit 246 and a gas-liquid separator 243; and
  the heat pump unit 246 is connected to the interface 126 of the four-way reversing valve through an air inlet interface 244 of the gas-liquid separator 243, an air exhaust interface 245 of the gas-liquid separator 243 is connected to the air suction end of the refrigeration compressor 118, the interface 127 of the four-way reversing valve is connected to one end of the coil heat exchanger 155, the other end of the coil heat exchanger 155 is connected to one end of the refrigerating agent heat exchange side 121 of the condenser/evaporator 119 through the expansion valve 122, and the other end of the refrigerating agent heat exchange side 121 of the condenser/evaporator 119 is connected to the interface 125 of the four-way reversing valve.

In one embodiment, the electric energy storage apparatus 2 further comprises the primary heat exchange closed energy tower heat pump ice crystal cold storage/water heat storage system;
  the primary heat exchange closed energy tower heat pump ice crystal cold storage/water heat storage system comprises the heat pump unit 246 and the gas-liquid separator 243; and
  one end of the coil heat exchanger 172 is connected to the interface 127 of the four-way reversing valve, the other end of the coil heat exchanger 172 is connected to one end of the refrigerating agent heat exchange side 121 of the condenser/evaporator 119 through the expansion valve 122, and the other end of the refrigerating agent heat exchange side 121 of the condenser/evaporator 119 is connected to the interface 125 of the four-way reversing valve.

In one embodiment, a second-stage pump unit 248 is further comprised; and
  the second-stage pump unit 248 comprises a second compressor 251, a condenser 252, a second expansion valve 255, an evaporator 256, and single and double-stage changeover valves 249, 250, 259, 260, 261 and 262.

One end of the single and double-stage changeover valve 250 is respectively connected to one end of the water heat exchange side 120 of the condenser/evaporator 119 of the heat pump unit 117 and one end of the single and double-stage changeover valve 260, the other end of the water heat exchange side 120 of the condenser/evaporator 119 of the heat pump unit 117 is respectively connected to one end of the single and double-stage changeover valve 249 and one end of the single and double-stage changeover valve 261, the other end of the single and double-stage changeover valve 250 is connected to one end of a water heat exchange side 258 of the evaporator 256 of the second-stage pump unit 248 through the output circulating pump 114, the other end of the water heat exchange side 258 of the evaporator 256 of the second-stage pump unit 248 is connected to the other end of the single and double-stage changeover valve 249, one end of a refrigerating agent heat exchange side 257 of the evaporator 256 of the second-stage pump unit 248 is connected to an air suction end of the second refrigeration compressor 251, the other end of the refrigerating agent heat exchange side 257 of the evaporator 256 of the second-stage pump unit 248 is connected to one end of a refrigerating agent heat exchange side 253 of the condenser 252 through the second expansion valve 255, the other end of the refrigerating agent heat exchange side 253 of the condenser 252 is connected to an air exhaust end of the second refrigeration compressor 251, one end of a water heat exchange side 254 of the condenser 252 is respectively connected to the other end of the single and double-stage changeover valve 260 and one end of the circulating pump 114 through one end of the single and double-stage changeover valve 259, the other end of the circulating pump 114 is connected to one end of a freezing coil heat exchanger 240, the other end of the freezing coil heat exchanger 240 is respectively connected to one end of the single and double-stage changeover valve 262 and the other end of the single and double-stage changeover valve 261 through the coupled circulating tank 112, the other end of the single and double-stage changeover valve 262 is connected to one end of a water heat exchange side 254 of the condenser 252 of the second-stage pump unit 248, and the other end of the water heat exchange side 254 of the condenser 252 of the second-stage pump unit 248 is connected to the other end of the single and double-stage changeover valve 259.

In one embodiment, a configured integrated machine room 263, the refrigeration unit 95, the heat pump unit 117, the heat pump unit 246, the second-stage pump unit 248, a configured power distribution apparatus 194, a detection automatic control apparatus 196, a remote monitoring apparatus 198, the cooling tower 104, the energy tower 147, the closed energy tower 154 and the closed energy tower 171 are comprised;

the heat pump unit 117, the refrigeration unit 95, the heat pump unit 246, the second-stage pump unit 248, the power distribution apparatus 194, the detection automatic control apparatus 196 and the remote monitoring apparatus 198 are all configured in the integrated machine room 263 and integrally manufactured by a factory;

the power distribution apparatus 194 comprises a power distribution cabinet 195, an input end of the power distribution cabinet 195 is connected to three-phase power A, B and C of the wind and photovoltaic power grid 1 through power interfaces 190, 191, 192 and 193, and an output end of the power distribution cabinet 195 is connected to a power input end of an electric device in the integrated machine room 263;

the detection automatic control apparatus 196 comprises a detection and/or automatic control cabinet 197, and the detection and/or automatic control cabinet 197 is connected to a detection and control device end needed in the integrated machine room 263;

the remote monitoring apparatus 198 comprises a mobile communication 3G or 4G or 5G or wireless local area network remote monitoring apparatus 199, and the mobile communication 3G or 4G or 5G or wireless local area network remote monitoring apparatus 199 is connected to the detection and/or automatic control cabinet 197 in the integrated machine room 263; and the cooling tower 104 or the energy tower 147 or the closed energy tower 154 or the closed energy tower 171 is arranged at one side of the integrated machine room 263 or above the integrated machine room 263, and is integrally assembled and manufactured by the factory.

Beneficial Effects

1. The photovoltaic energy storage power station of the application has a variable capacity to meet the needs of wind and photovoltaic power generation scales, it is absolutely safe and can be fully replicated. The photovoltaic energy storage power station can be widely popularized and applied, and can completely absorb the installed capacity configured by wind and photovoltaic power generation.

2. The photovoltaic energy storage power station of the present application can not only solve the pain point of wind and photovoltaic power generation consumption, but also can solve the absorption problem of thermal power generation at night valley points, and has great social significance.

3. The photovoltaic energy storage power station of the present application not only can store heat, but also can cool and directly supply heating and domestic hot water as well as chilled water of an air conditioner and a refrigerant of a refrigeration house to the user, especially in the south of China, which requires a long-term refrigeration air conditioner and a heating area in the north of China, and has a huge commercial profit effect.

4. The photovoltaic energy storage power station of the present application will completely rewrite the history of wind and photovoltaic power, which will no longer be regarded as garbage power because of the problem of energy storage. The present application will create a safe energy storage technology and equipment foundation for human beings to vigorously develop green energy, especially for wind and photovoltaic power generation, and is of great social significance to integrate the upstream and downstream markets of wind and photovoltaic power generation production, supply and marketing at the same time.

5. The photovoltaic energy storage power station of the present application can adapt to a household distributed light storage and charging system, especially an energy efficiency ratio of cold storage by using heat pump for heat storage and cold storage can reach 4 to 5; the heat storage of the photovoltaic energy storage power station can achieve an energy efficiency ratio of 2 to 3 in the cold regions of the three northeastern provinces in China, and can achieve an energy efficiency ratio of about 3 to 4 in North China for energy sales. In addition, energy stored by a battery is then returned to an electricity energy sales process; coupled with losses, the energy efficiency of the photovoltaic energy storage power station is estimated to be about 0.6 to 0.8 for electricity sales. Therefore, the economic benefits of heat pump energy storage are far greater than the values of battery energy storage.

DESCRIPTION OF THE DRAWINGS

In order to illustrate the technical solutions in the specific embodiments of the present application or in the related art more clearly, the drawings used in the description of the specific embodiments or the prior art will be briefly described below. Obviously, the drawings in the following description are merely some embodiments recorded in the present application. For those of ordinary skills in the art, other drawings may also be obtained based on these drawings without going through any creative work.

Figure 1:
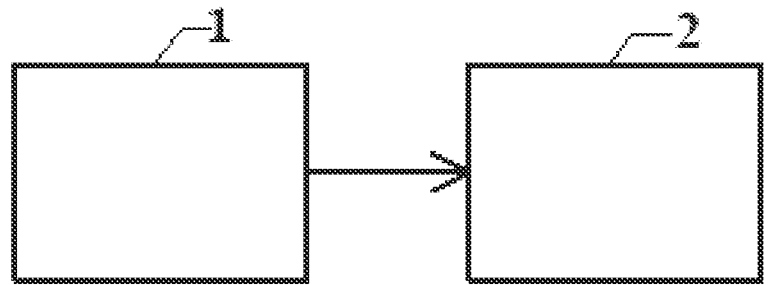
FIG. 1 is a block diagram of principle of the present application.

REFERENCE NUMERALS 1 refers to wind and photovoltaic power grid; 2 refers to electric energy storage apparatus; 4 refers to heating air-conditioning system; 5 refers to charging pile; 6 refers to light and/or load; 7 refers to phase-change heat storage apparatus; 8 refers to phase-change heat storage material; 9 refers to electric heating tube; 10 refers to electric heating tube; 11 refers to electric heating tube; 12 refers to electric heating tube; 13 refers to electric heating tube; 14 refers to electric heating tube; 15 refers to heating coil heat exchanger; 16 refers to coil heat exchanger interface; 17 refers to coil heat exchanger interface; 18 refers to sensible heat storage apparatus; 19 refers to sensible heat storage material; 20 refers to electric heating tube; 21 refers to electric heating tube; 22 refers to electric heating tube; 23 refers to heating coil heat exchanger; 24 refers to coil heat exchanger interface; 25 refers to coil heat exchanger interface; 26 refers to sensible heat reservoir; 27 refers to sensible heat storage material; 28 refers to electric heating tube; 29 refers to electric heating tube; 30 refers to electric heating tube; 31 refers to heating coil heat exchanger; 32 refers to coil heat exchanger interface; 33 refers to coil heat exchanger interface; 34 refers to sensible heat storage buffer apparatus; 35 refers to input coil heat exchanger; 36 refers to coil heat exchanger interface; 37 refers to coil heat exchanger interface; 38 refers to output coil heat exchanger; 39 refers to interface of output coil heat exchanger; 40 refers to interface of output coil heat exchanger; 41 refers to coupled circulating expansion tank; 42 refers to coupled circulating pump; 43 refers to sensible heat storage output apparatus; 44 refers to input coil heat exchanger; 45 refers to interface of input coil heat exchanger; 46 refers to interface of input coil heat exchanger; 47 refers to output coil heat exchanger; 48 refers to interface of output coil heat exchanger; 49 refers to interface of output coil heat exchanger; 50 refers to coupled circulating expansion tank; 51 refers to coupled circulating pump; 52 refers to air-conditioning output circulating pump; 53 refers to heating plate; 54 refers to wind and coil air conditioner; 55 refers to bathing device; 57 refers to molten salt; 58 refers to heat-conducting oil; 59 refers to water; 63 refers to air compressor; 66 refers to air reservoir; 67 refers to output interface; 68 refers to output interface; 69 refers to heat exchanger; 70 refers to interface; 71 refers to heat exchanger; 72 refers to first heat exchange side; 73 refers to second heat exchange side; 74 refers to third heat exchange side; 81 refers to expander; 82 refers to output end of expander; 83 refers to input interface; 84 refers to liquid-air reservoir; 85 refers to inner reservoir; 88 refers to liquid-air; 89 refers to throttle valve; 90 refers to heat preservation water tank; 92 refers to liquid-air release heat exchanger; 93 refers to air discharge port; 94 refers to chilled water; 95 refers to refrigeration unit; 96 refers to refrigeration compressor; 97 refers to condenser; 98 refers to refrigerating agent heat exchange side; 99 refers to water heat exchange side; 100 refers to evaporator; 101 refers to water heat exchange side; 102 refers to expansion valve; 103 refers to cooling water circulating pump; 104 refers to cooling tower; 105 refers to tower fan; 106 refers to spraying apparatus; 107 refers to air inlet; 109 refers to interface; 110 refers to unit interface; 112 refers to coupled circulating tank; 112-1 refers to ice storage refrigerant circulating tank; 112-2 refers to ice storage refrigerant circulating tank; 113-1 refers to refrigerant; 114-2 refers to refrigerant circulating pump; 115 refers to coil interface; 116 refers to tower spraying pump; 117 refers to water source heat pump unit; 118 refers to refrigeration compressor; 119 refers to condenser/evaporator; 120 refers to water heat exchange side; 121 refers to refrigerating agent heat exchange side; 122 refers to expansion valve; 123 refers to four-way reversing valve; 124 refers to interface of four-way reversing valve; 125 refers to interface of four-way reversing valve; 126 refers to interface of four-way reversing valve; 127 refers to interface of four-way reversing valve; 128 refers to four-way reversing valve; 129 refers to four-way reversing valve; 133 refers to evaporation/condenser; 134 refers to refrigerating agent heat exchange side; 135 refers to water heat exchange side; 136 refers to water source circulating pump; 141 refers to ice reservoir; 144 refers to ice storage refrigerant heat exchange coil; 146 refers to ice-melting heat exchange coil; 147 refers to energy tower; 148 refers to anti-freezing solution/water; 149 refers to spraying apparatus; 150 refers to tower fan; 151 refers to air inlet; 154 refers to closed energy tower; 155 refers to coil heat exchanger; 157 refers to spraying apparatus; 158 refers to closed tower fan; 159 refers to anti-freezing solution/water; 162 refers to tower spraying pump; 164 refers to anti-freezing solution/water reservoir; 165 refers to anti-freezing solution/water; 171 refers to closed energy tower; 172 refers to coil heat exchanger; 173 refers to tower filler; 190 refers to power interface; 191 refers to power interface; 192 refers to power interface; 193 refers to power interface; 194 refers to configured power distribution apparatus; 195 refers to power distribution cabinet; 196 refers to detection automatic control apparatus; 197 refers to detection and/or automatic control cabinet; 198 refers to remote monitoring apparatus; 199 refers to remote network monitoring apparatus; 207 refers to ice-melting frozen water reservoir; 208 refers to normal temperature chilled water; 209 refers to heat exchange side; 210 refers to secondary heat exchange side; 230 refers to cooling water; 231 refers to organic solution reservoir; 232 refers to sodium formate solution; 233 refers to first heat exchange side; 234 refers to second heat exchange side; 239 refers to energy reservoir; 240 refers to coil primary heat exchanger; 241 refers to coil secondary heat exchanger; 243 refers to energy storage water; 244 refers to air inlet interface; 245 refers to air exhaust interface; 246 refers to heat pump unit; 248 refers to second-stage pump unit; 29 refers to single and double-stage changeover valve; 250 refers to single and double-stage changeover valve; 251 refers to second compressor; 252 refers to condenser; 253 refers to refrigerating agent heat exchange side; 254 refers to water heat exchange side; 255 refers to second expansion valve; 256 refers to evaporator; 257 refers to refrigerating agent heat exchange side; 258 refers to water heat exchange side; 259 refers to single and double-stage changeover valve; 260 refers to single and double-stage changeover valve; 261 refers to single and double-stage changeover valve; 262 refers to single and double-stage changeover valve; 263 refers to integrated machine room; and 264 refers to refrigerating agent heat exchange side.

DETAILED DESCRIPTION OF PREFERRED EMBODIMENTS

The following clearly and completely describes the technical solutions of the present application with reference to the embodiments. Apparently, the described embodiments are merely some but not all of the embodiments of the present application. Based on the embodiments in the present application, all other embodiments obtained by those of ordinary skills in the art without going through any creative work shall fall within the scope of protection of the present application.

In the description of the present application, it should be understood that the orientations or positional relationships indicated by the terms such as "center", "longitudinal", "transversal", "length", "width", "thickness", "upper", "lower", "front", "rear", "left", "right", "vertical", "horizontal", "top", "bottom", "inner", "outer", "clockwise", "anti-clockwise", and the like, refer to the orientations or positional relationships based on the drawings, which are only intended to facilitate describing the present application and simplifying the description, and do not indicate or imply that the indicated devices or elements must have a specific orientation, be constructed and operated in a specific orientation, and therefore cannot be understood as a limitation of the present application.

Moreover, the terms "first" and "second" are only used for descriptive purposes, but cannot be understood as indicating or implying relative importance, or implicitly indicating the number of indicated technical features. Therefore, the features defined with "first" and "second" can explicitly or implicitly include one or more of the features. In the description of the present application, the meaning of "multiple" is two or more than two, unless otherwise specifically defined. In addition, terms such as "installation", "connected" and "connection", etc., should be understood broadly, for example, the connection may be fixed connection, or detachable connection or integral connection; may be mechanical connection, and may also be electrical connection; and may be direct connection, may also be indirect connection through an intermediate medium, and may also be internal communication of two elements. The specific meaning of the above terms the present application can be understood in a specific case by those of ordinary skills in the art.

FIG. 1 is a block diagram of principle of the present application. In the figure, an electric energy storage apparatus is composed of a wind and photovoltaic power grid 1 and an electric energy storage apparatus 2.

The wind and photovoltaic power grid 1 generates electricity through wind and photovoltaic and the generated electricity is integrated into a public grid system. An input end of the electric energy storage apparatus 2 is connected to the wind and photovoltaic power grid 1. The electric energy storage apparatus 2 is used to absorb the electric energy of the wind and photovoltaic power grid 1 as needed and store the electric energy in an energy storage mode. An output end of the electric energy storage apparatus 2 supplies the stored energy to users.

Figure 2:
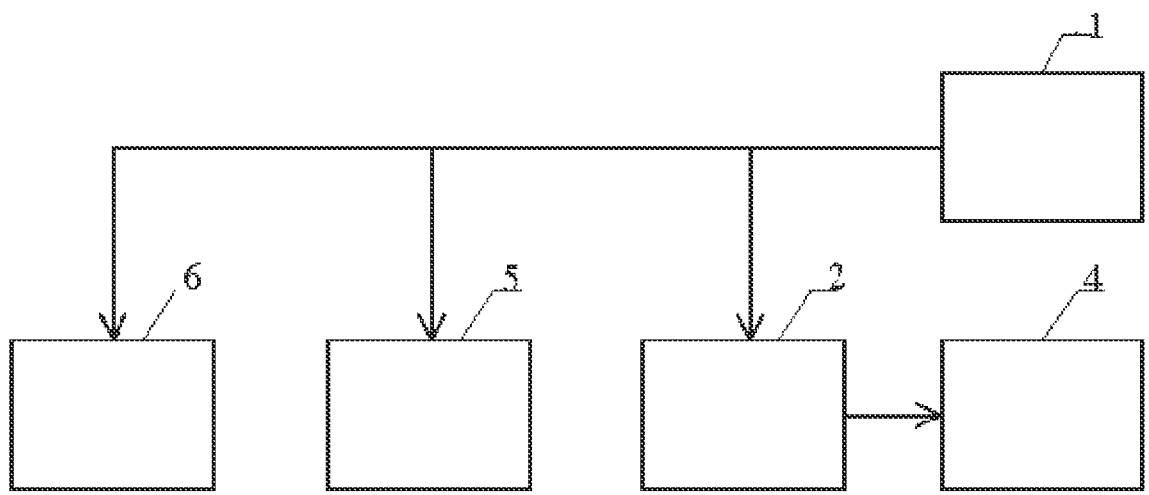
FIG. 2 is a block diagram of principle implementation of the present application.

FIG. 2 is a block diagram of principle implementation of the present application. In FIG. 2, a photovoltaic energy storage power station is composed of the wind and photovoltaic power grid 1, the electric energy storage apparatus 2, a heating air-conditioning system 4, a charging pile 5, and a light and/or load 6.

Photovoltaic and wind power generation are integrated into an urban power grid to supply power to public electricity users. When the wind and photovoltaic power grid 1 generate electricity, the electricity is integrated into the power grid to sell and supplied to a user through the charging pile 5 and the light and/or load 6. When the urban power grid is in a valley power period, the electric energy storage apparatus 2 absorbs the electric energy of the wind and photovoltaic power grid 1 that is not used at night, and stores the electric energy in a form of heat by the electric energy storage apparatus 2. When the urban power grid enters a peak power period, heating is realized by the electric energy storage apparatus 2 through the heating air-conditioning system 4, and the user can be provided with domestic hot water and bath water.

The electric energy storage apparatus 2 may be composed of any one of a phase-change heat storage apparatus or a sensible heat storage apparatus or a thermochemical heat storage apparatus or an adsorption heat storage device.

The charging pile 5 may provide services for charging new energy vehicles and electric vehicles. The light and/or load 6 may supply power to a lighting system supplying power to public places and all electrical equipment of an electric terminal.

Figure 3:
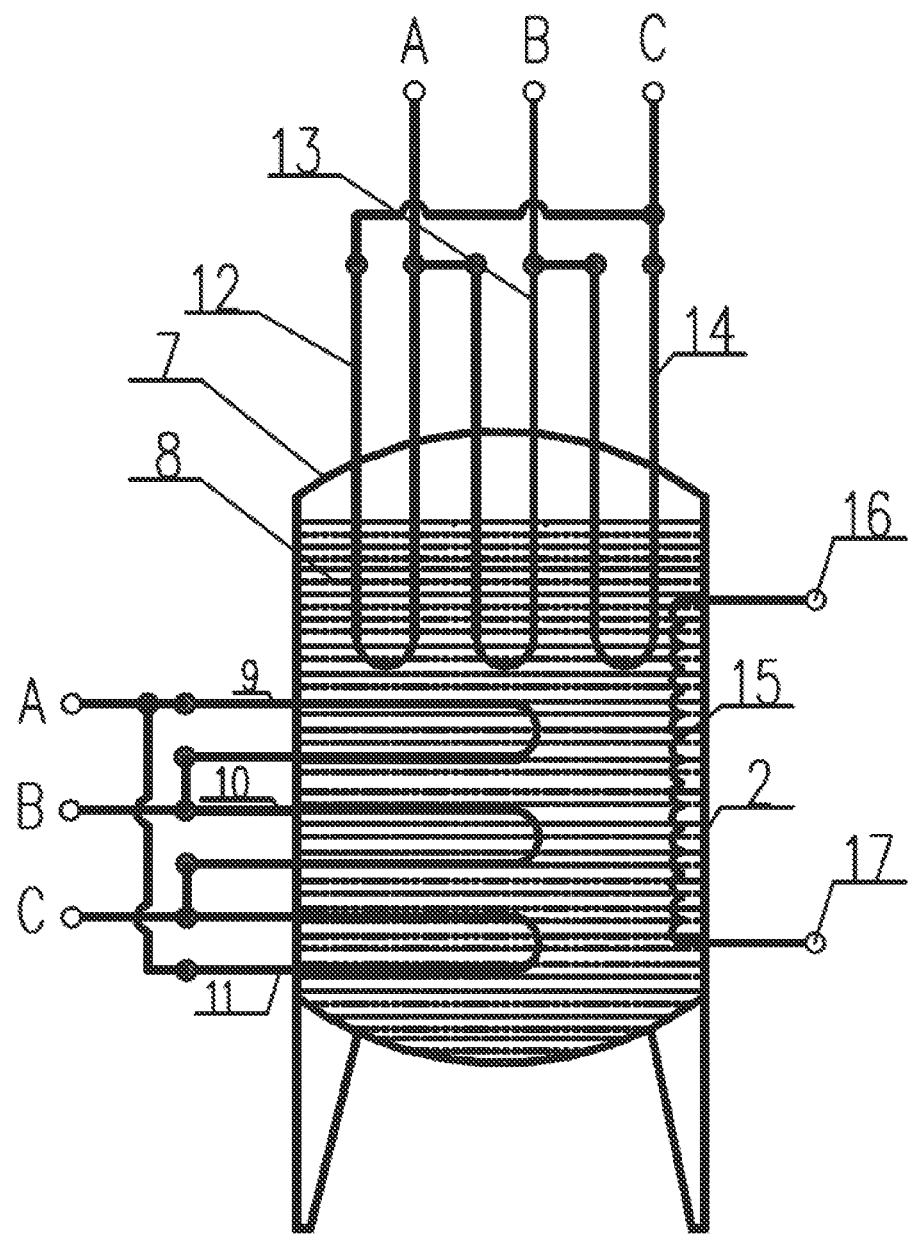
FIG. 3 is an embodiment of a phase-change heat storage apparatus of the present application.

FIG. 3 is an embodiment of a phase-change heat storage apparatus of the present application. In FIG. 3, the electric energy storage apparatus 2 is composed of a phase-change heat storage apparatus 7, a phase-change heat storage material 8, at least one set of electric heating tubes 9, 10 and 11 and a heating coil heat exchanger 15.

The phase-change heat storage apparatus may be provided with two sets of electric heating tubes according to actual needs, wherein one set of electric heating tubes 9, 10 and 11 are arranged at one side of the phase-change heat storage apparatus 7, and the other sets of electric heating tubes 12, 13 and 14 are arranged at an upper portion of the phase-change heat storage apparatus 7.

The phase-change heat storage material 8 and the electric heating tubes 9, 10 and 11 used in the phase-change heat storage apparatus 7 should be fully immersed in the phase-change heat storage material 8, and power interfaces A, B and C of the electric heating apparatus are connected to the wind and photovoltaic power grid 1.

The heating coil heat exchanger 15 in the phase-change heat storage apparatus 7 should be immersed in the phase-change heat storage material 8, and the coil heat exchanger interfaces 16 and 17 of the heating coil heat exchanger 15 supply heat through the heating air-conditioning system 4.

There are a variety of phase-change heat storage materials 8, but the material with large latent heat enthalpy should be selected as the phase-change heat storage material 8, so that a volume of a heat storage container can be reduced, and the specific selection will not be described here one by one.

Figure 4:
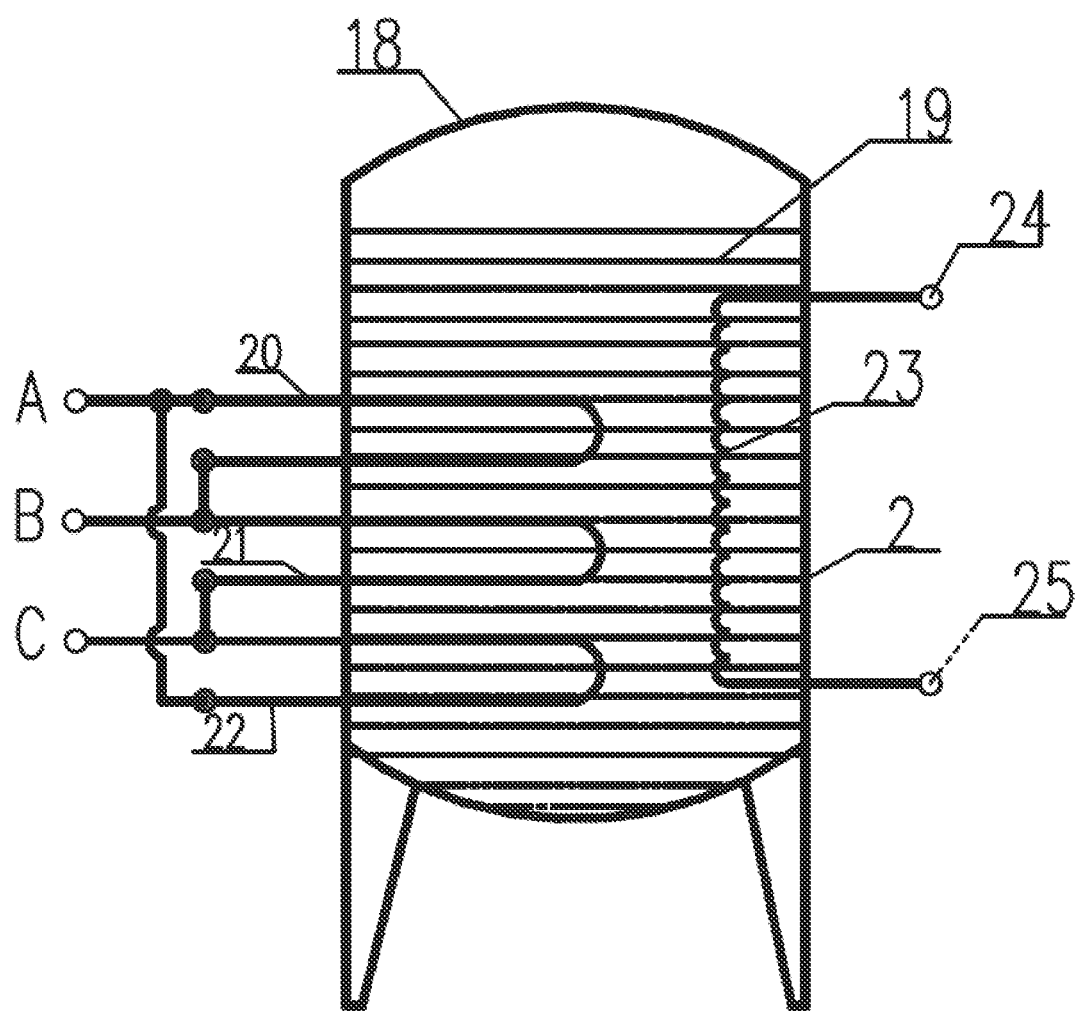
FIG. 4 is an embodiment of a sensible heat storage apparatus of the present application.

FIG. 4 is an embodiment of a sensible heat storage apparatus of the present application. In FIG. 4, the electric energy storage apparatus 2 is composed of a sensible heat storage apparatus 18, a sensible heat storage material 19, at least one set of electric heating tubes 20, 21 and 22 and a heating coil heat exchanger 23.

The electric heating tubes 20, 21 and 22 are immersed in the sensible heat storage material 19, and power interfaces A, B and C of the electric heating tubes 20, 21 and 22 are connected to the wind and photovoltaic power grid 1.

The heating coil heat exchanger 23 is immersed in the sensible heat storage material 19, and the coil heat exchanger interfaces 24 and 25 of the heating coil heat exchanger 19 are connected to heating and domestic hot water interfaces of the heating air-conditioning system 4 at the user side.

Figure 5:
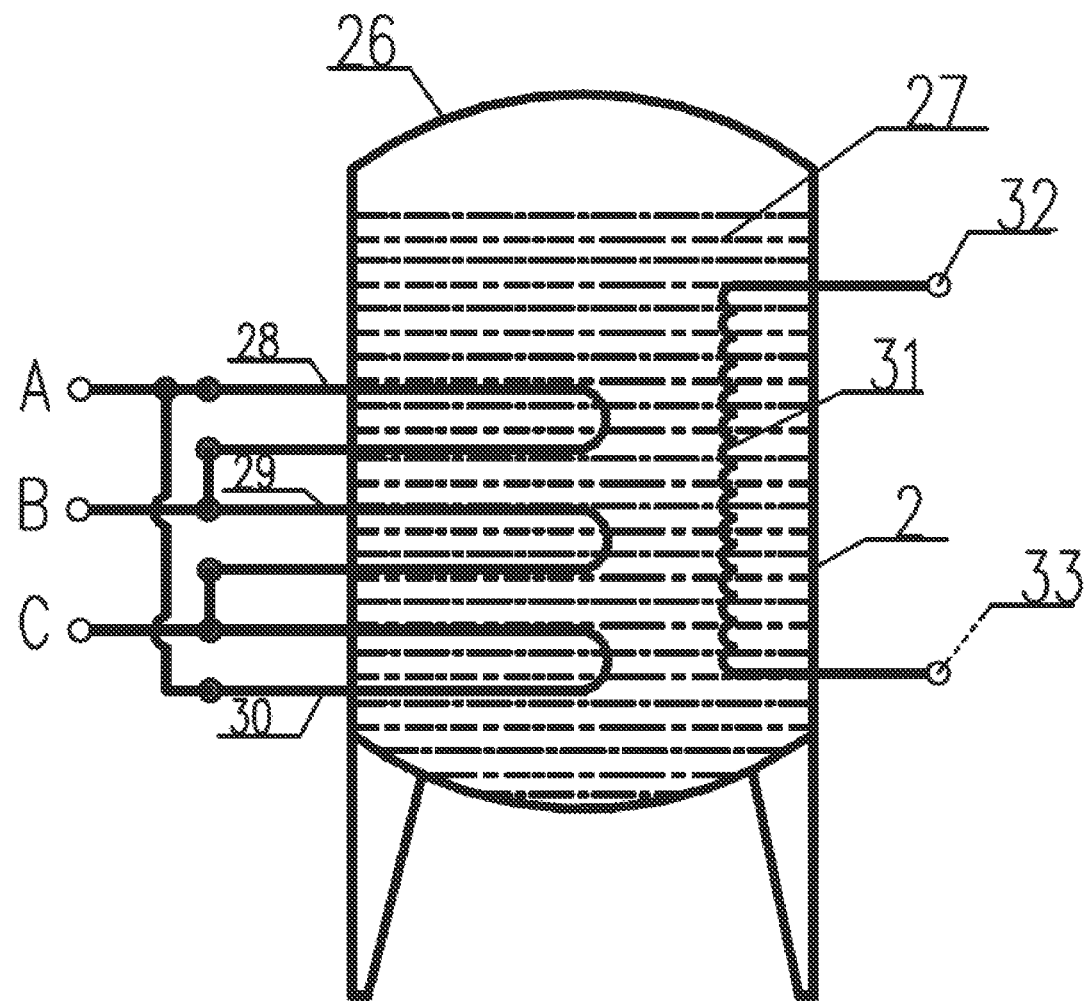
FIG. 5 is an embodiment of a sensible heat storage apparatus of the present application.

FIG. 5 is an embodiment of the sensible heat storage apparatus of the present application. In FIG. 5, the electric energy storage apparatus 2 is composed of a sensible heat reservoir 26, a sensible heat storage material 27, at least one set of electric heating tubes 28, 29 and 30 and a heating coil heat exchanger 31.

The electric heating tubes 28, 29 and 30 are immersed in the sensible heat storage material 27, and power interfaces A, B and C of the electric heating tubes 28, 29 and 30 are connected to the wind and photovoltaic power grid 1.

The heating coil heat exchanger 31 is immersed in the sensible heat storage material 27, and the coil heat exchanger interfaces 32 and 33 of the heating coil heat exchanger 31 are connected to the heating air-conditioning system 4.

Figure 6:
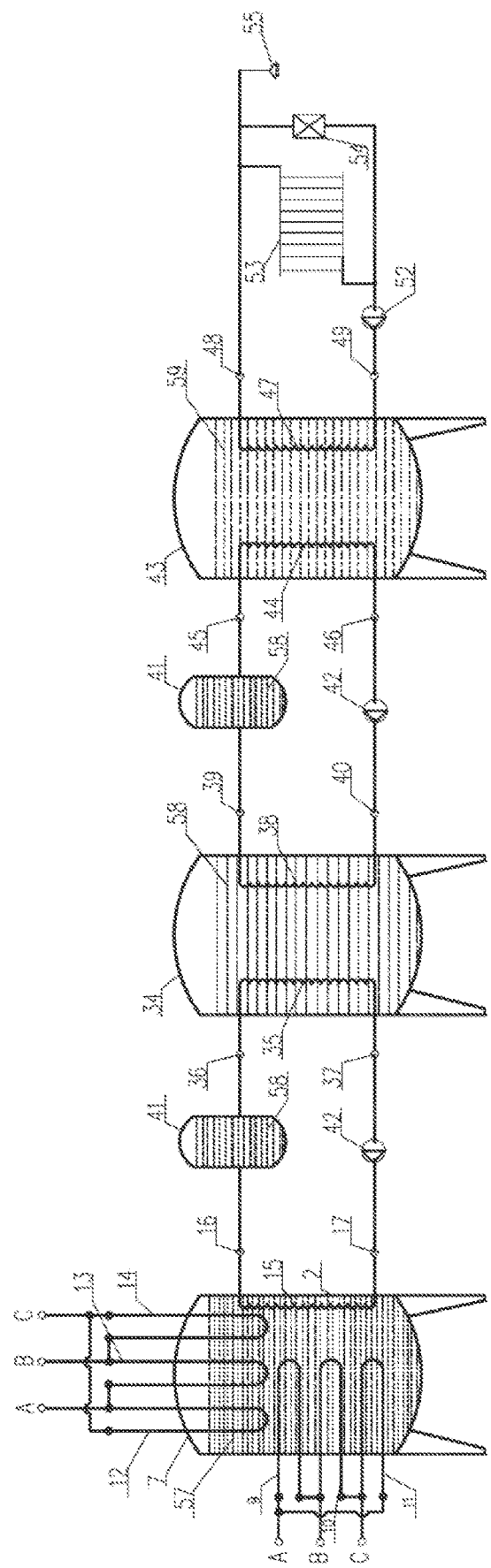
FIG. 6 is an embodiment of a salt-soluble phase change heat storage system of the present application.

FIG. 6 is an embodiment of a salt-soluble phase change heat storage system of the present application. In FIG. 6, the electric energy storage apparatus 2 is composed of the phase-change heat storage apparatus 7, an organic salt 57, a heat-conducting oil or organic solution 58, water 59, a sensible heat storage buffer apparatus 34, a sensible heat storage output apparatus 43, a coupled circulating expansion tank 41, a coupled circulating pump 42, an air-conditioning output circulating pump 52, a heating plate 53, a coil air conditioner 54 and a bathing device 55.

In FIG. 6, the sensible heat storage buffer apparatus 34 is composed of the heat-conducting oil 58, an input coil heat exchanger 35 and an output coil heat exchanger 38. The input coil heat exchanger 35 is immersed in the heat-conducting oil 58, and the output coil heat exchanger 38 is immersed in the heat-conducting oil 58.

In FIG. 6, the sensible heat storage output apparatus 43 is composed of the sensible heat material water 59, an input coil heat exchanger 44 and an output coil heat exchanger 47. The input coil heat exchanger 44 is immersed in the water 59, and the output coil heat exchanger 47 is immersed in the water 59. One end of the heating coil heat exchanger 15 of the phase-change heat storage apparatus 7 is connected to one end of the coupled circulating expansion tank 41 through the interface 16 of the heating coil heat exchanger, the other end of the coupled circulating expansion tank 41 is connected to one end of the input coil heat exchanger 35 of the sensible heat storage buffer apparatus 34 through an interface 36 of the input coil heat exchanger, the other end of the input coil heat exchanger 35 of the sensible heat storage buffer apparatus 34 is connected to one end of the coupled circulating pump 42 through an interface 37 of the input coil heat exchanger, and the other end of the coupled circulating pump 42 is connected to the other end of the heating coil heat exchanger 15 through the interface 17 of the heating coil heat exchange. One end of the output coil heat exchanger 38 is connected to one end of the coupled circulating expansion tank 41 through an interface 39 of the output coil heat exchanger, the other end of the coupled circulating expansion tank 41 is connected to one end of the input coil heat exchanger 44 of the sensible heat storage output apparatus 43 through an interface 45 of the input coil heat exchanger, the other end of the input coil heat exchanger 44 is connected to one end of the coupled circulating pump 42 through an interface 46 of the input coil heat exchanger, the other end of the coupled circulating pump 42 is connected to the other end of the output coil heat exchanger 38 through an interface 40 of the output coil heat exchanger, one end of the output coil heat exchanger 47 of the sensible heat storage output apparatus 43 is respectively connected to the heating plate 53, the fan coil air conditioner 54 and one end of the bathing device 55 through an interface

48 of the output coil heat exchanger, and the other end of the output coil heat exchanger 47 of the sensible heat storage output tank 43 is respectively connected to the heating plate 53, the fan coil air conditioner 54 and one end of the bathing device 55 through an interface 49 of the output coil heat exchanger and the air-conditioning output circulating pump 52.

In FIG. 6, the molten salt 57 is adopted in the phase-change heat storage apparatus 7. The advantage of using the molten salt 57 is that the molten salt 57 can store a lot of heat in a phase change process, and a temperature thereof can be heated to 500° C., up to 600° C. The molten salt is a very good phase change material, which can greatly reduce a volume of a heat storage container and reduce an occupied area. In addition, the molten salt 57 is solid at room temperature, and when the molten salt is heated to above 140° C. by the electric heating apparatuses 12, 13 and 14, the molten salt becomes liquid, and the molten salt has very good fluidity and reduced viscosity, so the molten salt can be circulated and transported for a long distance as a high-temperature heat source for heating, which is very convenient.

In FIG. 6, the heat-conducting oil 58 is used in the sensible heat storage buffer apparatus 34 because a temperature of the heat-conducting oil can reach 350° C., and the pressure increase is not great. The heat-conducting oil does not corrode metal materials, which is a characteristic that ordinary heat transfer media do not have.

In FIG. 6, the sensible heat storage output apparatus 43 is configured because it is very dangerous to use the phase-change heat storage apparatus 7 for heating after the molten salt 57 is used as the phase-change heat storage apparatus 7 and electrically heated to 300° ° C. Therefore, the sensible heat storage buffer apparatus 34 uses the heat-conducting oil 58 to buffer and then exchange heat with the sensible heat storage output apparatus 43 to the sensible heat material water 59, and the sensible heat storage material water 59 is cooled to control the safe and appropriate heating and heating temperature, and then output for heating.

Figure 7:
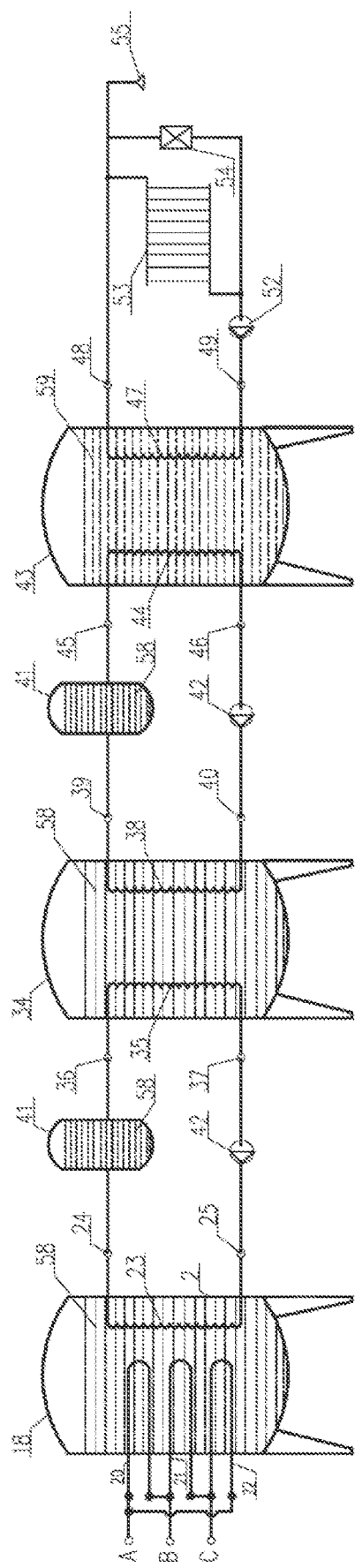
FIG. 7 is an embodiment of a heat-conducting oil sensible heat storage system of the present application.

FIG. 7 is an embodiment of a heat-conducting oil sensible heat storage system of the present application. In FIG. 7, the electric energy storage apparatus 2 is composed of the sensible heat storage apparatus 18, the heat-conducting oil 58, the water 59, the sensible heat storage buffer apparatus 34, the sensible heat storage output apparatus 43, the coupled circulating expansion tank 41, the coupled circulating pump 42, the air-conditioning output circulating pump 52, the heating plate 53, the wind and coil air conditioner 54 and the bathing device 55.

One end of the heating coil heat exchanger 23 of the sensible heat storage apparatus 18 is connected to one end of the coupled circulating expansion tank 41 through the interface 24 of the heating coil heat exchanger, the other end of the coupled circulating expansion tank 41 is connected to one end of the input coil heat exchanger 35 through an interface 36 of the input coil heat exchanger, the other end of the input coil heat exchanger 35 is connected to one end of the coupled circulating pump 42 through an interface 37 of the input coil heat exchanger, and the other end of the coupled circulating pump 42 is connected to the other end of the heating coil heat exchanger 23 through the interface 25 of the heating coil heat exchange.

In FIG. 7, the heat-conducting oil 58 is used in the sensible heat storage apparatus 18 because of the characteristics of safety, convenient storage and circulating flow of the heat-conducting oil. But the enthalpy of heat storage is not high, which is lower than those of both water and organic solutions. Obviously, the water still has the highest enthalpy, but the highest temperatures of the water and general organic salt solutions are limited and cannot exceed 100° C., otherwise the water and general organic salt solutions are vaporized in phase change, but organic solutions can adapt to sensible heat storage applications over 100° C.

Figure 8:
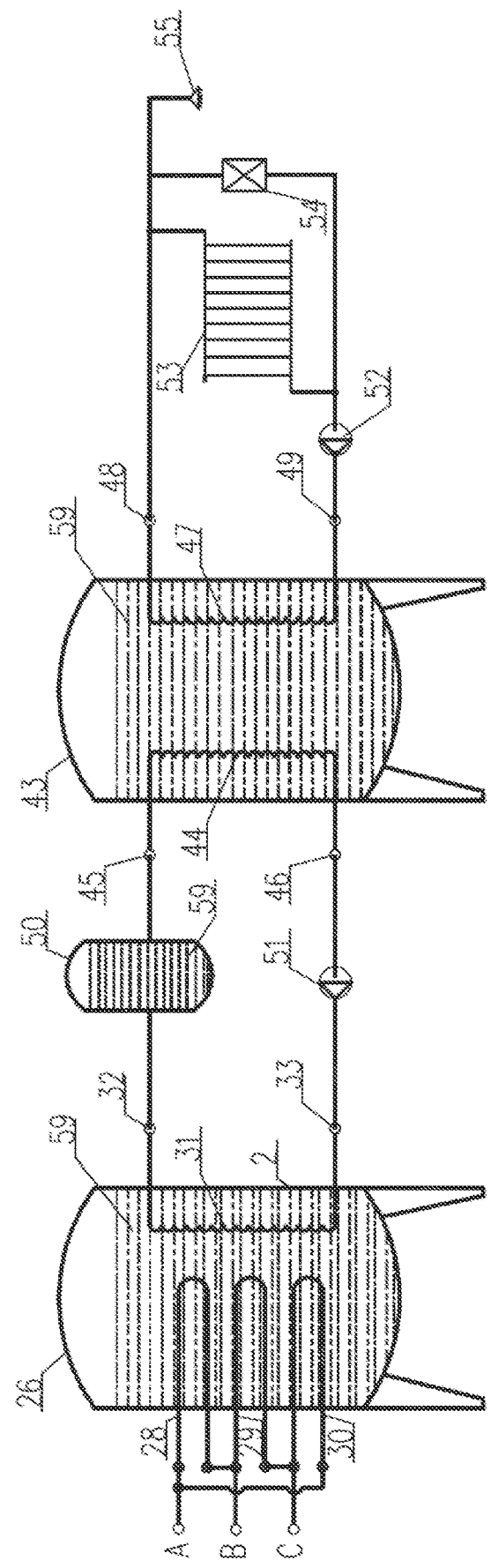
FIG. 8 is an embodiment of a water sensible heat storage apparatus of the present application.

FIG. 8 is an embodiment of a water sensible heat storage apparatus of the present application. In FIG. 8, the electric energy storage apparatus 2 is composed of the sensible heat storage apparatus 26, the water 59, the sensible heat storage output apparatus 43, the coupled circulating expansion tank 50, the coupled circulating pump 51, the air-conditioning output circulating pump 52, the heating plate 53, the wind and coil air conditioner 54 and the bathing device 55.

In the figure, one end of the heating coil heat exchanger 31 of the sensible heat storage apparatus 26 is connected to one end of the coupled circulating expansion tank 50 through the interface 32 of the heating coil heat exchanger, the other end of the coupled circulating expansion tank 50 is connected to one end of the input coil heat exchanger 44 of the sensible heat storage output tank 43 through the interface 45 of the input coil heat exchanger, the other end of the input coil heat exchanger 44 is connected to one end of the coupled circulating pump 51 through the interface 46 of the input coil heat exchanger, and the other end of the coupled circulating pump 51 is connected to the other end of the heating coil heat exchanger 31 through the interface 33 of the heating coil heat exchanger.

Since both the sensible heat storage apparatus 26 and the sensible heat storage output apparatus 43 use the water 59, the heat storage temperature will not exceed 100° C., so two stages have met the requirements.

In order to expand the operating benefits of the photovoltaic power grid, the photovoltaic power grid should not only store heat, but also store cold, and selectively store heat or cold according to needs to adapt to and expand market demands, so that the economic benefits of the photovoltaic power grid will increase.

The electric energy storage apparatus 2 is composed of any one of phase-change air-separation cold storage or ice cold storage or chilled water cold storage or heat pump organic solution cold storage/heat or heat pump heat-conducting oil cold storage/heat or heat pump water cold storage/heat storage system.

The phase-change air-separation cold storage system further comprises any one of liquid-air, liquid-oxygen, liquid-nitrogen, liquid-argon and liquefied petrochemical natural gas cryogenic system.

Figure 9:
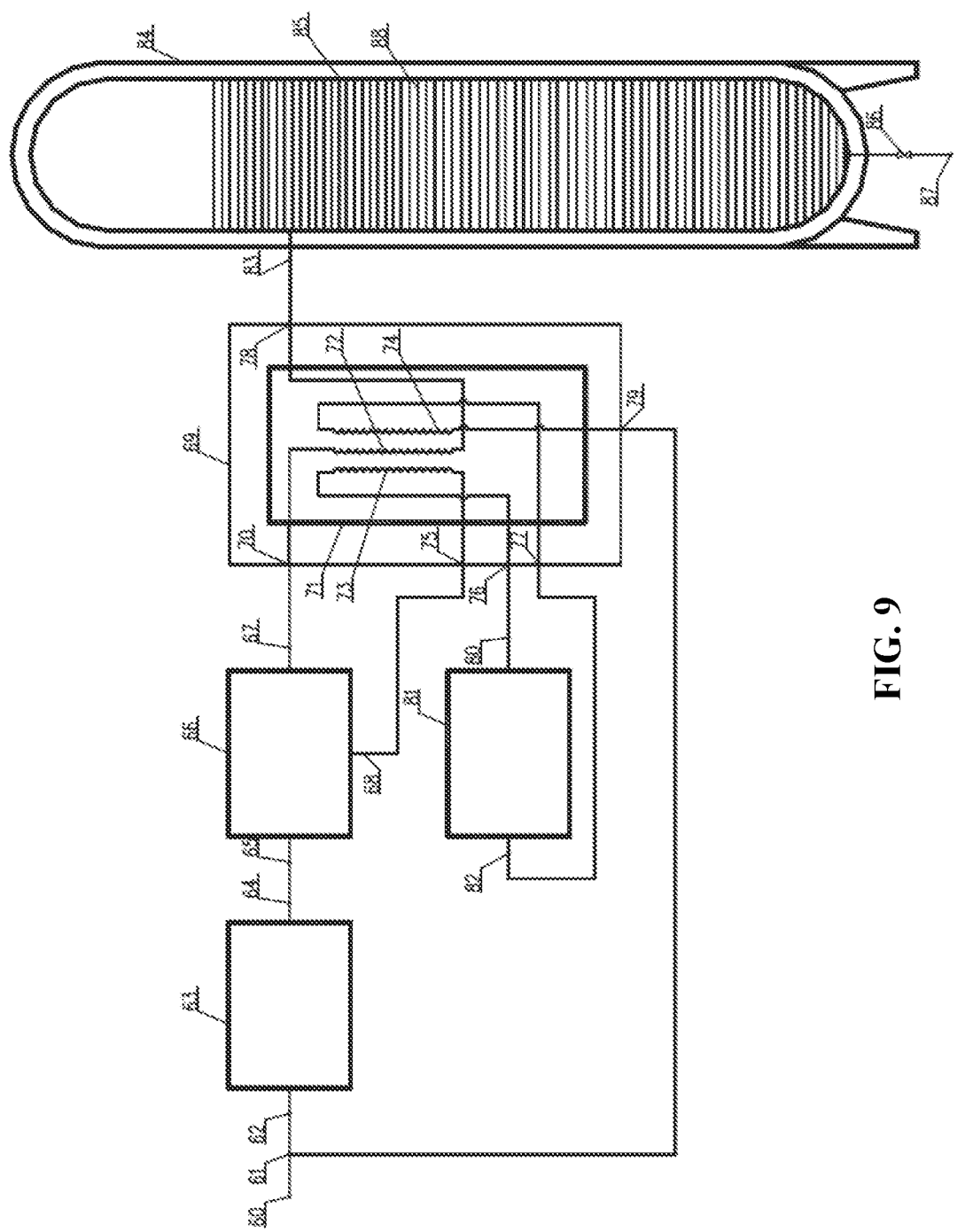
FIG. 9 is a schematic diagram of an embodiment of a liquid-air cryogenic storage system of the present application.

FIG. 9 is a schematic diagram of an embodiment of a liquid-air cryogenic storage system of the present application. In FIG. 9, the phase-change liquid-air cold storage system is composed of an air compressor 63, an air reservoir 66, a heat exchange apparatus 69, a heat exchanger 71, an expander 81, a liquid-air reservoir 84, an inner reservoir 85 and liquid-air 88.

An input end of the air compressor 63 is communicated with air, an output end of the air compressor 63 is connected to an input end of the air reservoir 66, an output end of the air reservoir 66 is connected to a subsequent device in two passages, a first passage is connected to one end of a first heat exchange side 72 of the heat exchanger 71 in the heat exchange apparatus 69, the other end of the first heat exchange side 72 of the heat exchanger 71 in the heat exchange apparatus 69 is connected to the liquid-air reservoir 84, a second passage is connected to one end of a second heat exchange side 73 of the heat exchanger 71 in the heat exchange apparatus 69, the other end of the second heat exchange side 73 of the heat exchanger 71 is connected to an input end of the expander 81, an output end of the expander 81 is connected to one end of a third heat exchange side 74 of the heat exchanger 71, and the other end of the third heat exchange side 74 of the heat exchanger 71 is connected to an input end of the air compressor 63.

In the figure, the air compressor 63 is filtered and compressed by the air input end to the air reservoir 66 for storage, and is output in two passages. One passage is input to the first heat exchange side 72 of the heat exchanger 71 through an output interface 67 of the air reservoir 66 and an interface 70 of the heat exchanger 71. The second passage is input from an output interface 68 of the air reservoir 66 to one end of the second heat exchange side 73 of the heat exchanger 71 through an interface 75 of the heat exchanger 71, and is input to the expand 81 through an input end 80 of the expander 81 through the other end of the second heat exchange side 73. After being expanded by the expander 81, a pressure of the compressed air drops sharply, and the air temperature drops sharply to a low temperature, and then the compressed air is input from an output end 82 of the expander to the third heat exchange side 74 of the heat exchanger 71 through an interface 77 of the heat exchanger 71. The low-temperature air expanded by the expander 81 cools the compressed air passing through the first heat exchange side 72 of the heat exchanger 71 through the third heat exchange side 74 of the heat exchanger 71, reduces the temperature of the compressed air passing through the first heat exchange side 72 of the heat exchanger 71 to the liquid-air 88, enters the liquid-air reservoir 85 through an input interface 83 of the liquid-air reservoir 85 through an interface 78 of the heat exchanger, and is stored in an internal extraction tank 85.

The above-mentioned preparation process of the liquid-air is only a schematic process. Because the temperature of the liquid-air 88 reaches about −193° C., it is necessary to store the liquid-air in a Dewar vessel, which has a double-layer metal structure and is highly vacuum-insulated.

Figure 10:
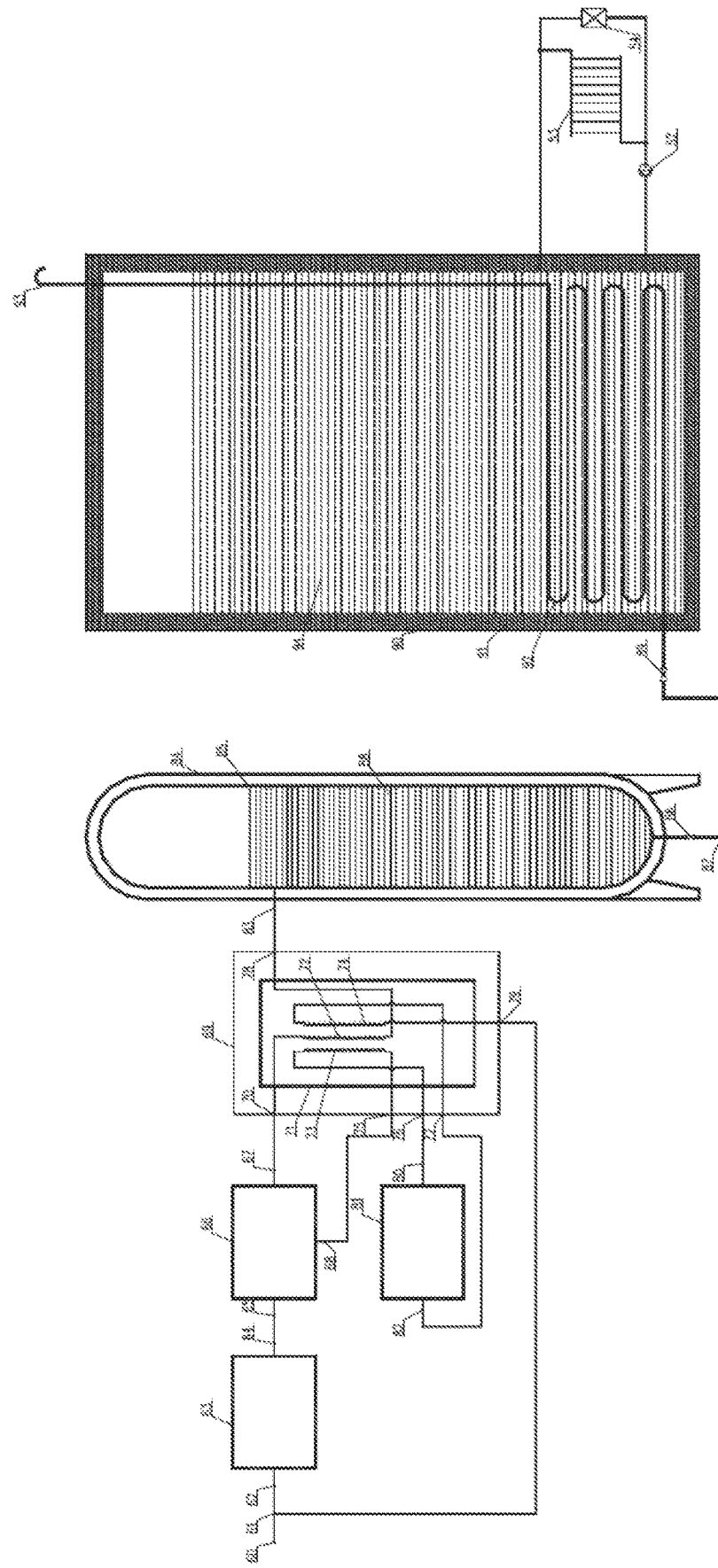
FIG. 10 is a schematic diagram of an embodiment of a liquid-air cryogenic storage air-conditioning refrigeration system of the present application.

FIG. 10 is a schematic diagram of an embodiment of a liquid-air cryogenic storage air-conditioning refrigeration system of the present application. In FIG. 10, the phase-change liquid-air cold storage system is configured with a heat preservation water tank 90, a liquid-air release heat exchanger 92, chilled water 94, an air discharge port 93, the air-conditioning output circulating pump 52, the heating plate 53, the coil air conditioner 54 and a liquid-air cryogenic air-conditioning refrigeration system.

The chilled water 94 is arranged in the heat preservation water tank 90, the liquid-air release heat exchanger 92 is arranged and immersed in the chilled water 94, one end of the liquid-air release heat exchanger 92 is communicated with the liquid-air 88 in the inner reservoir 85 of the liquid-air reservoir 84 through a throttle valve 89, and one end of the liquid-air release heat exchanger 92 is communicated with the air discharge port 93.

One end of the air-conditioning output circulating pump 52 is connected to the heat preservation water tank 90 and communicated with the chilled water 94, the other end of the air-conditioning output circulating pump 52 is respectively connected to one ends of the heating plate 53 and the coil air conditioner 54, and the other ends of the heating plate 53 and the coil air conditioner 54 are connected to the heat preservation water tank 90 and communicated with the chilled water 94.

By adjusting the throttle valve 89, a flow of the liquid-air into the liquid-air release heat exchanger 92 is controlled, so as to achieve refrigeration to the chilled water 94, and the chilled water 94 is cooled to a water temperature of 7° C., and then circulated into the heating plate 53 or the fan coil air conditioner 54 through the air-conditioning output circulating pump 52, so as to cool and air-condition an indoor room. After releasing cold energy, the liquid-air evaporates and absorbs the heat in the chilled water 94 to become air, and then is discharged to the atmosphere through the air discharge port 93.

The above refrigeration and air-conditioning system can be realized by both using the liquid-air or liquid-nitrogen. The liquid-air has the lowest cost and is of great environmental protection significance. Air is a natural refrigeration agent refrigerant system and will not pollute the atmosphere like chemical refrigeration agents.

Figure 11:
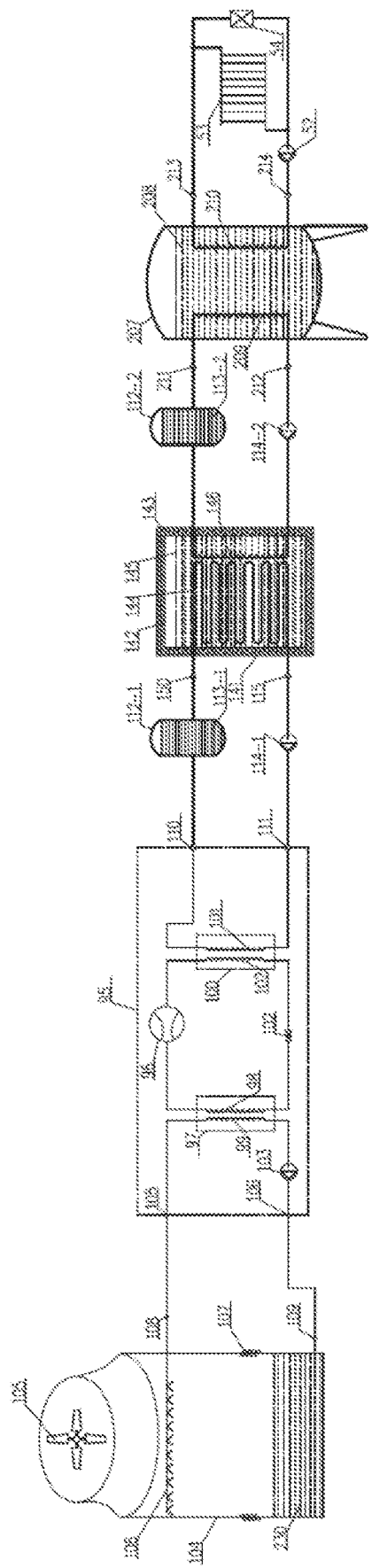
FIG. 11 is a schematic diagram of an embodiment of an ice storage air-conditioning refrigeration system of the present application.

FIG. 11 is a schematic diagram of an embodiment of an ice storage air-conditioning refrigeration system of the present application. In FIG. 11, the ice storage system comprises a refrigeration unit 95, a cooling tower 104, a coupled circulating tank 112, an ice reservoir 141, an ice-melting frozen water reservoir 207, a cooling water circulating pump 103, refrigerant circulating pumps 114-1 and 114-2, an air-conditioning output circulating pump 52, a heating plate 53 and a fan coil air conditioner 54.

The refrigeration unit 95 comprises a refrigeration compressor 96, a condenser 97, an expansion valve 102 and an evaporator 100.

The cooling tower 104 comprises a tower fan 105, a spraying apparatus 106, an air inlet 107 and cooling water 230. The tower fan 105 is arranged above the spraying apparatus 106, the spraying apparatus 106 is arranged between the tower fan 105 and the air inlet 107, the air inlet 107 is arranged above a liquid level of the cooling water 230, and the cooling water 230 is arranged below the cooling tower 104.

The ice reservoir 141 comprises an ice storage refrigerant heat exchange coil 144, an ice-melting heat exchange coil 146, an ice storage refrigerant circulating tank 112-1 and a refrigerant 113-1.

The refrigerants 113-1 and 113-2 are anti-freezing solutions.

An air exhaust end of the refrigeration compressor 96 is connected to one end of a refrigerating agent heat exchange side 98 of the condenser 97, the other end of the refrigerating agent heat exchange side 98 of the condenser 97 is connected to one end of a refrigerating agent heat exchange side 264 of the evaporator 102 through the expansion valve 102, the other end of the refrigerating agent heat exchange side 264 of the evaporator 100 is connected to an air suction end of the refrigeration compressor 96, one end of a water heat exchange side 99 of the condenser 97 is connected to the spraying apparatus 106, the other end of the water heat exchange side 99 of the condenser 97 is connected to the cooling tower 104 through the cooling water circulating pump 103, and is communicated with the cooling water 230 in the cooling tower 104, one end of a water heat exchange side 101 of the evaporator 100 is connected to one end of the ice storage refrigerant circulating tank 112-1 and communicated with the refrigerant 113-1, the other end of the ice storage refrigerant circulating tank 112-1 is connected to one end of the ice storage refrigerant heat exchange coil 144, the other end of the ice storage refrigerant heat exchange coil 144 is connected to the other end of the water heat exchange side 101 of the evaporator 100 through the refrigerant circulating pump 114-1, one end of the ice-melting heat exchange coil 146 is connected to one end of the primary heat exchange side 209 of the ice-melting frozen water reservoir 207 through the ice-melting circulating tank 112-2 and communicated with the refrigerant 113-2, the other end of the primary heat exchange side 209 of the ice-melting frozen water reservoir 207 is connected to the other end of the ice-melting heat exchange coil 146 through the refrigerant circulating pump 114-2, one end of the secondary heat exchange side 210 of the ice-melting frozen water reservoir 207 is respectively connected to the heating plate and one end of the fan coil air conditioner 54, and the one ends of the heating plate 53 and the fan coil air conditioner 54 are connected to the other end of the secondary heat exchange side 210 of the ice-melting frozen water reservoir 207 through the air-conditioning output circulating pump 52.

During a valley power period of the photovoltaic power grid, the refrigeration compressor 96 of the refrigeration unit 95 runs during an ice storage operation, and high-pressure refrigerating agent exhaust enters the refrigerating agent heat exchange side 98 of the condenser 97 from an exhaust end of the refrigeration compressor 96 to condense and release heat to the water heat exchange side 99. The cooling water 230 circulated by the cooling pump 103 takes the cooling water with condensation heat away from an interface 109 of the cooling tower 104 through the water heat exchange side 99 by the cooling pump 103, and inputs the cooling water into the spraying apparatus 146, and sprays water mist to perform reverse friction heat exchange with air entering through the air inlet 107, so as to transfer the condensation heat to the air. As the tower fan 105 operates, the cooling tower 104 forms a negative pressure, and the air enters through the air inlet 107, and the condensation heat exchanged to the air is exhausted to the atmosphere through the tower fan to complete the condensation effect.

The high-pressure refrigerating agent exhaust enters the refrigerating agent heat exchange side 98 of the condenser 97 through the exhaust end of the refrigeration compressor 96, and the refrigerating agent gas in the refrigerating agent heat exchange side 98 of the heat release condenser 97 condenses to form a liquid refrigerating agent, which is throttled and expanded by the expansion valve 102, and then enters the refrigerating agent heat exchange side 264 of the evaporator 100 to evaporate and absorb the heat in the refrigerant 113-1 at the water heat exchange side 101 circulated by the refrigerant circulating pumps 114-1. The liquid refrigerating agent evaporates to form a gaseous state, which is sucked by the air suction end of the refrigeration compressor 96 and continues to compress and repeat the above refrigeration and compression cycle, and continuously absorbs the heat in the refrigerant 113-1, resulting in the cooling of the refrigerant 113-1 and circulating through the refrigerant circulation pump 114-1, enters the ice storage refrigerant heat exchange coil 144 from the coil interface 115, contacts with the ice water 145 through an surface of the ice storage refrigerant heat exchange coil 144 for heat exchange, and the ice water 145 is taken away from the coil pan interface 150 through the ice storage refrigerant circulating tank 112-1 and enters the water heat exchange side 101 of the evaporator 100 through the unit interface 110, and continues to be evaporated and absorbed by the refrigerating agent heat exchange side 264, so as to further reduce the temperature of the refrigerant 113-1 and finally freeze the ice water 145 into ice. Because the latent heat of ice is greater than that of other media, the effect of cold storage is better. The ice-melting frozen water reservoir 207 enters through the refrigerant 113-2 circulated by the refrigerant circulating pump 114-2 during the peak power period, and the primary heat exchange side 209 of the ice-melting frozen water reservoir 207 circulates into the ice-melting heat exchange coil 146 through the ice-melting circulating tank 112-2 to melt the ice accumulated by the ice water 145 with the normal temperature chilled water 208. The temperature of the refrigerant 113-2 circulating in the ice-melting heat exchange coil 146 is lowered due to the large amount of heat absorbed to the outside when the ice melts, and the refrigerant 113-2 circulates into the ice-melting frozen water reservoir 207 through the refrigerant circulating pump 114-2, and further releases the cold energy to the chilled water 208 through the primary heat exchange side 209. After continuous coupling, the circulating ice is melted into ice water, and is output by the air-conditioning output circulating pump 52 to the fan coil air conditioner 53 for indoor air-conditioning refrigeration.

Figure 12:
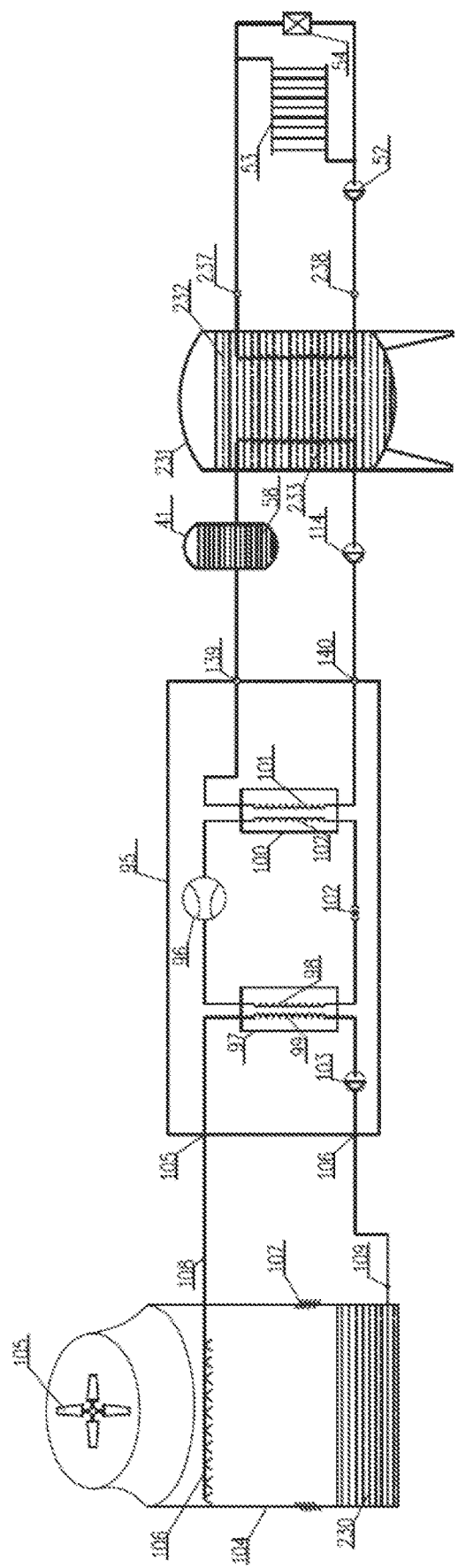
FIG. 12 is a schematic diagram of an embodiment of an ice crystal chilled water storage air-conditioning refrigeration system of the present application.

FIG. 12 is a schematic diagram of an embodiment of an ice crystal chilled water storage air-conditioning refrigeration system of the present application. In FIG. 12, the organic solution cold storage system is composed of the refrigeration unit 95, the cooling tower 104, an organic solution reservoir 231 and a sodium formate solution 232.

One end of a first heat exchange side 233 in the organic solution reservoir 231 is connected to one end of the water heat exchange side 101 of the evaporator 100 through the coupled circulating tank 41, the other end of the water heat exchange side 101 of the evaporator 100 is connected to the other end of the first heat exchange side 233 in the organic solution reservoir 231 through the coupled circulating pump 42, one end of a second heat exchange side 234 in the organic solution reservoir 231 is respectively connected to one ends of the air-conditioning output circulating pump 52, the heating plate 53 and the fan coil air conditioner 54, and the other ends of the heating plate 53 and the fan coil air conditioner 54 are connected to the other end of the second heat exchange side 234 in the organic solution reservoir 231.

The sodium formate solution 232 in the organic solution reservoir 231 is an organic salt solution, which is suitable for cold storage at low temperature and has the advantages of light corrosion to metal materials and strong fluidity.

Figure 13A:
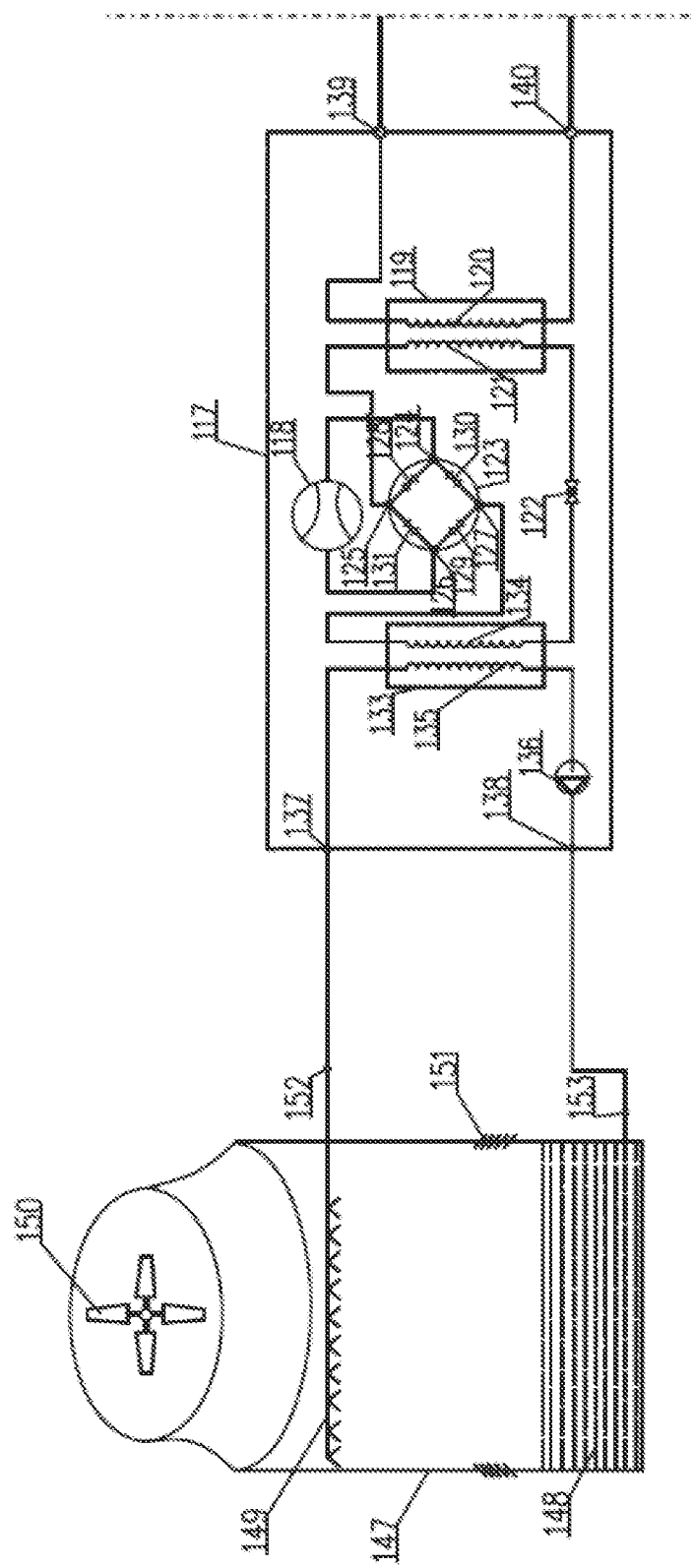
FIG. 13 with partial views FIGS. 13A-13B provide a schematic diagram of an embodiment of an ice crystal chilled water energy storage open energy tower heat pump air-conditioning system of the present application.
Figure 13B:
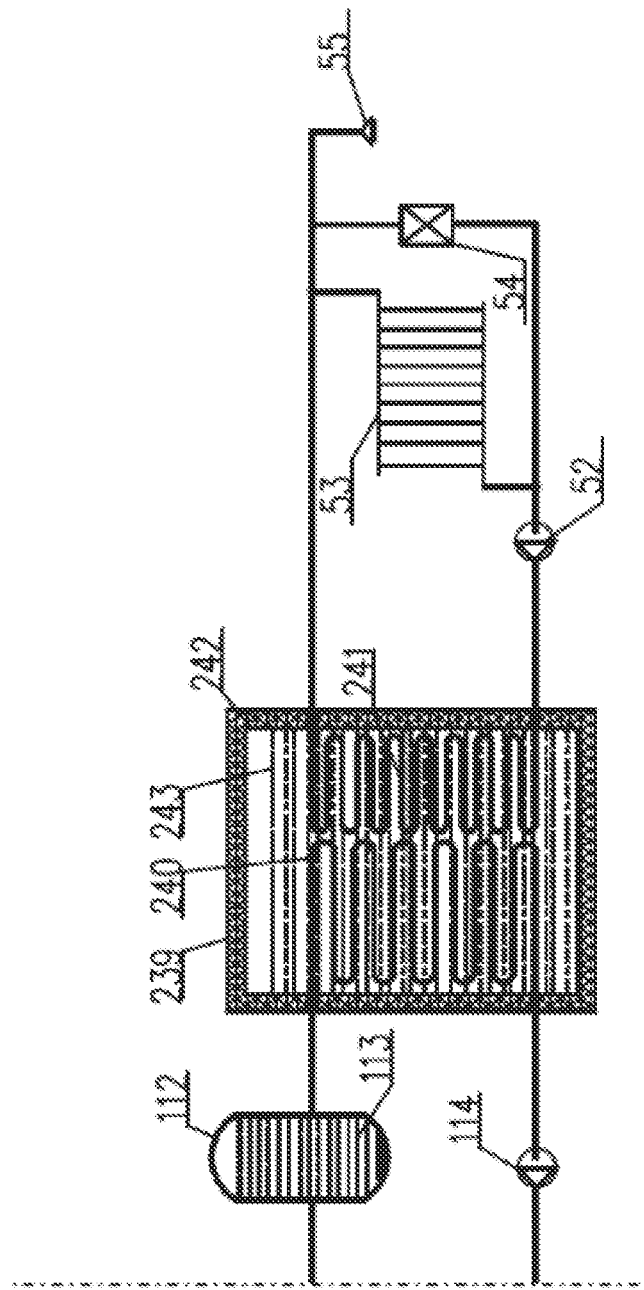

FIG. 13 is a schematic diagram of an embodiment of an ice crystal chilled water energy storage open energy tower heat pump air-conditioning system of the present application. In FIG. 13, the heat pump ice crystal cold storage/water heat storage system is composed of a water source heat pump unit 117, an energy tower 147, an energy reservoir 239, the air-conditioning output circulating pump 52, the heating plate 53 and the fan coil air conditioner 54.

The water source heat pump unit 117 is composed of a refrigeration compressor 118, a condenser/evaporator 119, an expansion valve 122, an evaporator/condenser 133 and a four-way reversing valve 123.

The energy tower 147 is composed of a tower fan 150, a spraying apparatus 149, an air inlet 151 and an anti-freezing solution/water 148.

The energy reservoir 239 is composed of a coil primary heat exchanger 240, a coil secondary heat exchanger 241 and energy storage water 243.

One end of the coil primary heat exchanger 240 in the energy reservoir 239 is connected to one end of the water heat exchange side 120 of the condenser/evaporator 119 through a coupled circulating tank 112, the other end of the water heat exchange side 120 of the condenser/evaporator 119 is connected to the other end of the coil primary heat exchanger 240 in the energy reservoir 239 through the coupled circulating pump 114, an air exhaust end of the refrigeration compressor 118 of the water source heat pump unit 117 passes through a four-way reversing valve 128 through an interface 124 of the four-way reversing valve and is connected to one end of a refrigerating agent heat exchange side 121 of the condenser/evaporator 119 through an interface 125 of the four-way reversing valve, the other end of the refrigerating agent heat exchange side 121 of the condenser/evaporator 119 is connected to one end of a refrigerating agent heat exchange side 134 of the evaporator/condenser 133 through the expansion valve 122, the other end of the refrigerating agent heat exchange side 134 of the evaporator/condenser 133 passes through a four-way reversing valve 129 through an interface 127 of the four-way reversing valve and is connected to an air suction end of the refrigeration compressor 118 through an interface 126 of the four-way reversing valve, one end of a water heat exchange side 135 of the evaporator/condenser 133 is connected to the spraying apparatus 149 of the energy tower 147, and the other end of the water heat exchange side 135 of the evaporator/condenser 133 is connected to the energy tower 147 through a water source circulating pump 136 and communicated with the anti-freezing solution/water 148 in the energy tower 147. FIG. 13 and FIG. 12 have the same working principle except that the four-way reversing valve 129 is added in FIG. 13, which can realize refrigeration/heating conversion. Because the refrigeration compressor unit runs in a bidirectional way, the evaporator is called evaporator/condenser, and while the condenser is called condenser/evaporator.

FIG. 13 shows the use of an open energy tower heat pump to store crystallized water in summer, which aims at using the ice water in this state with a latent heat equivalent to that of ice, but does not need to melt ice, saving a lot of running electric energy, and the system structure is simple and the cost is cheaper than ice storage. In winter, water is used for heat storage, although the volume is not as small as an electric storage volume, the energy efficiency of the heat pump is approximately 3 times to 5 times higher than that of the electric heat storage. Therefore, the photovoltaic energy storage is far away from the economic benefits of the heat pump energy storage, and the heat pump energy storage is safe and reliable.

Figure 14A:
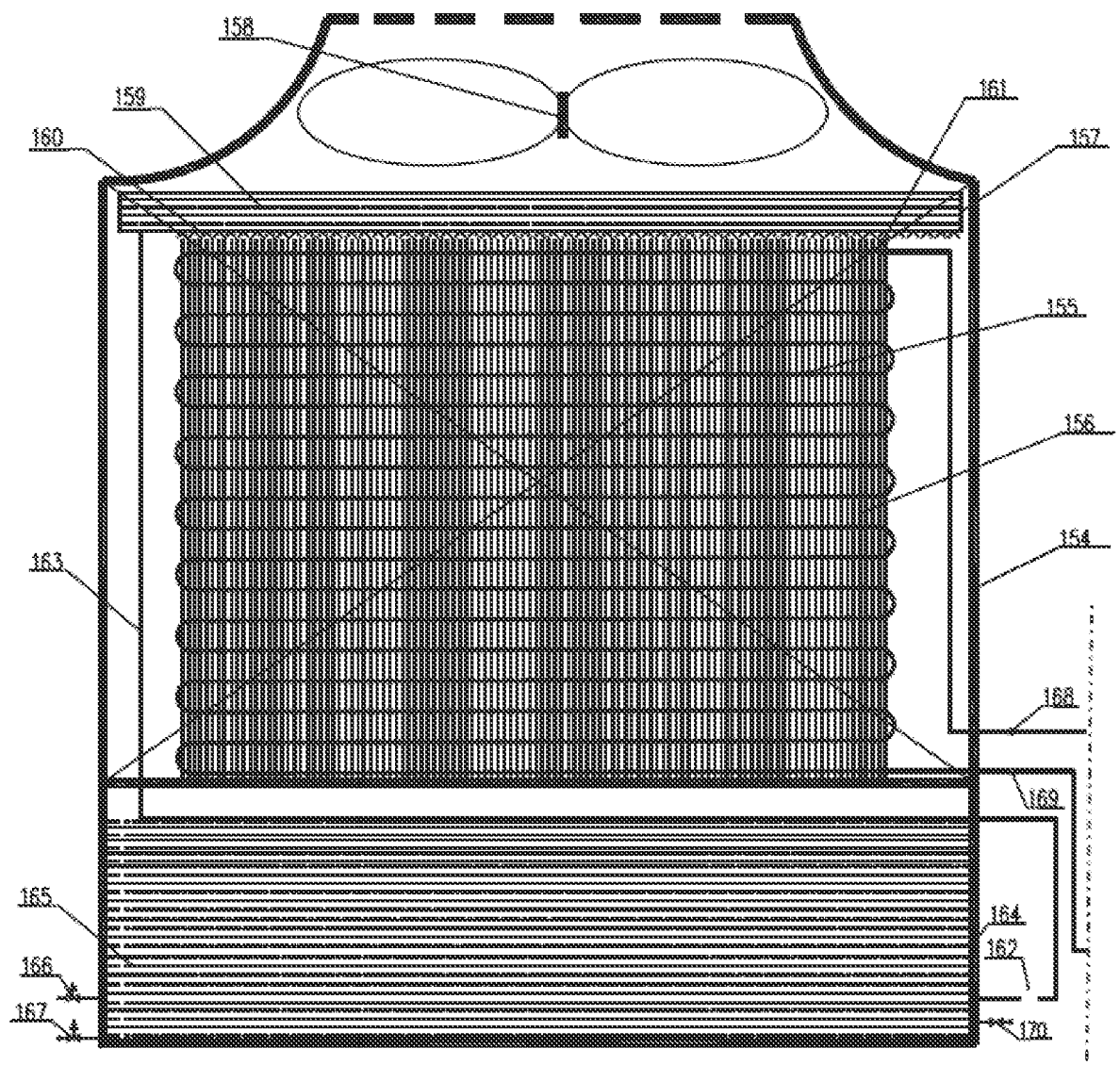
FIG. 14 with partial views FIGS. 14A-14C provide a schematic diagram of an embodiment of an ice crystal chilled water energy storage closed cross-flow energy tower heat pump air-conditioning system of the present application.
Figure 14B:
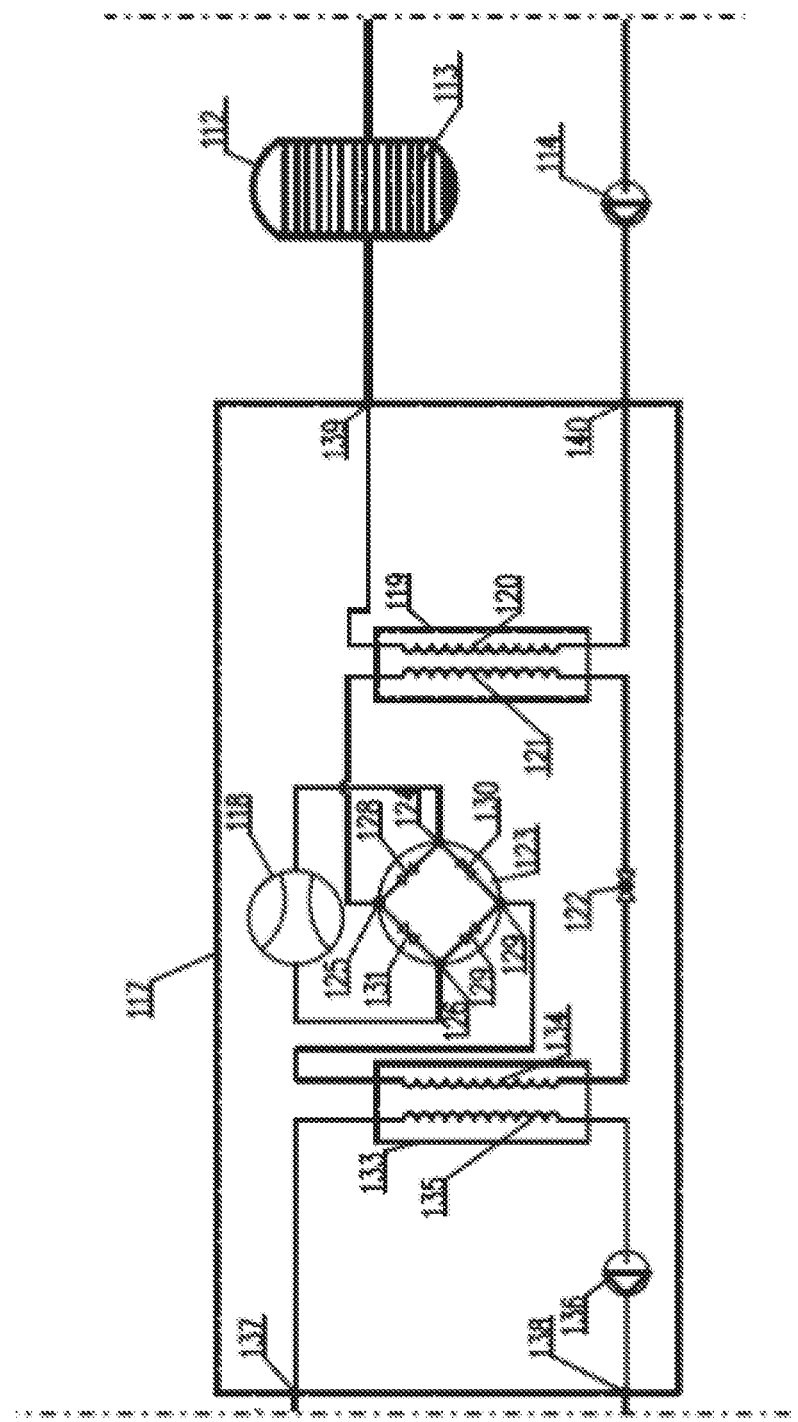
Figure 14C:
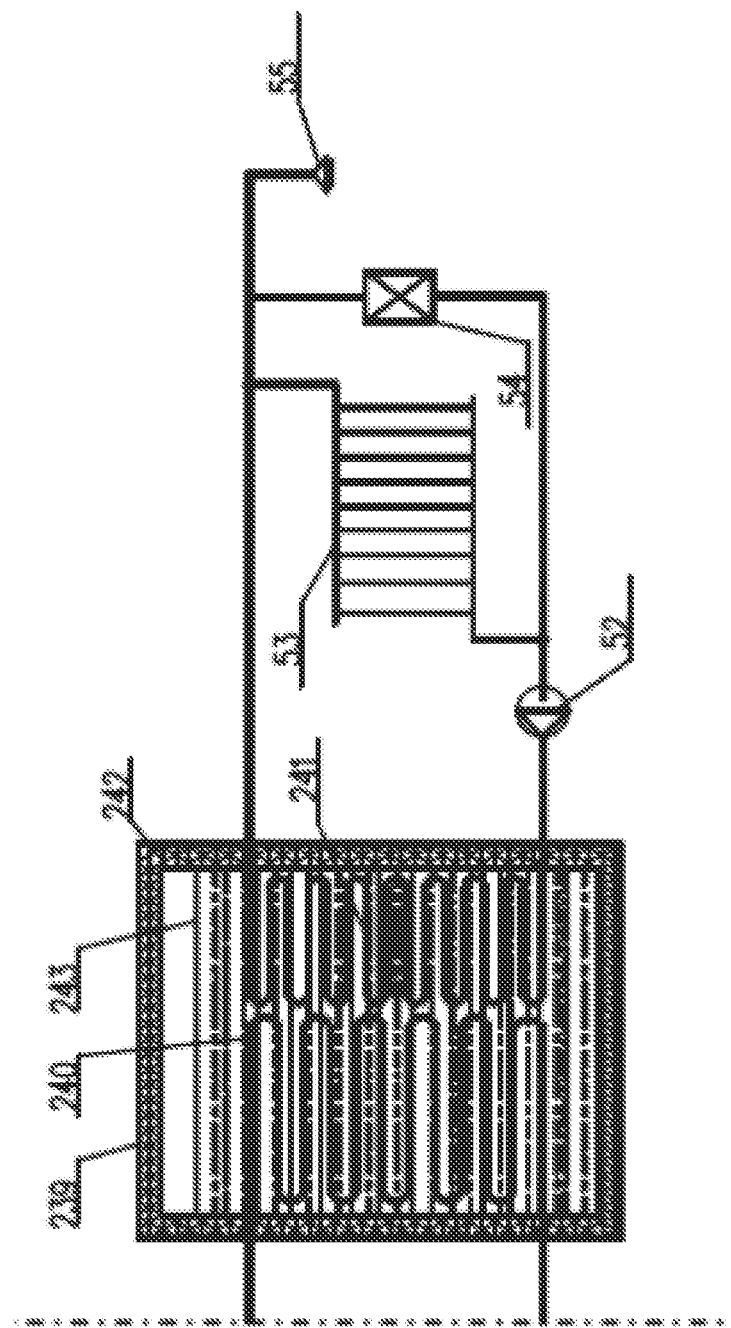

FIG. 14 is a schematic diagram of an embodiment of an ice crystal chilled water energy storage closed cross-flow energy tower heat pump air-conditioning system of the present application. In FIG. 14, the closed energy tower heat pump ice crystal cold storage/water heat storage system is composed of a closed energy tower 154, a spraying pump 162, at least one set of coil heat exchangers 155, a spraying apparatus 157 and an anti-freezing solution/water 165.

A bottom portion of the closed energy tower 154 is provided with an anti-freezing solution/water reservoir 164, one end of the tower spraying pump 162 is connected to the anti-freezing solution/water reservoir 164 and communicated with the anti-freezing solution/water 165, and the other end of the tower spraying pump 162 is connected to the spraying apparatus 157 and communicated with an anti-freezing solution or water 159 in the spraying apparatus 157. The closed tower fan 158 is arranged a above the spraying apparatus 157, the spraying apparatus 157 is arranged below the closed tower fan 158 and arranged above the coil heat exchanger 155, a lower portion of the coil heat exchanger 155 is arranged at an upper portion of the anti-freezing solution/water reservoir 164 and arranged above a liquid level of the anti-freezing solution/water 165, and air horizontally enters the closed energy tower 154 only through an outer surface of the coil heat exchanger 155 and is exhausted out of the closed energy tower 154 through the closed tower fan 158.

FIG. 14 is the same as FIG. 13, except for the energy tower. During operation, the cold/hot medium on the water heat exchange side 135 of the evaporator/condenser 133 in FIG. 13 are circulated by the water source circulating pump 136, and directly contact with the air through the open energy tower 147 for heat exchange, so the efficiency is high. The closed energy tower 154 in FIG. 14 circulates in the coil heat exchanger 155 through the water source circulating pump 136, and then exchanges heat with air through spraying on an outer wall of the coil heat exchanger 155. Although a cleaner circulation can be obtained at the water heat exchange side 135 of the evaporator/condenser 133, the efficiency is not as high as that of an open energy tower. A working principle of the specific water source heat pump is exactly the same and will not be repeated.

Figure 15A:
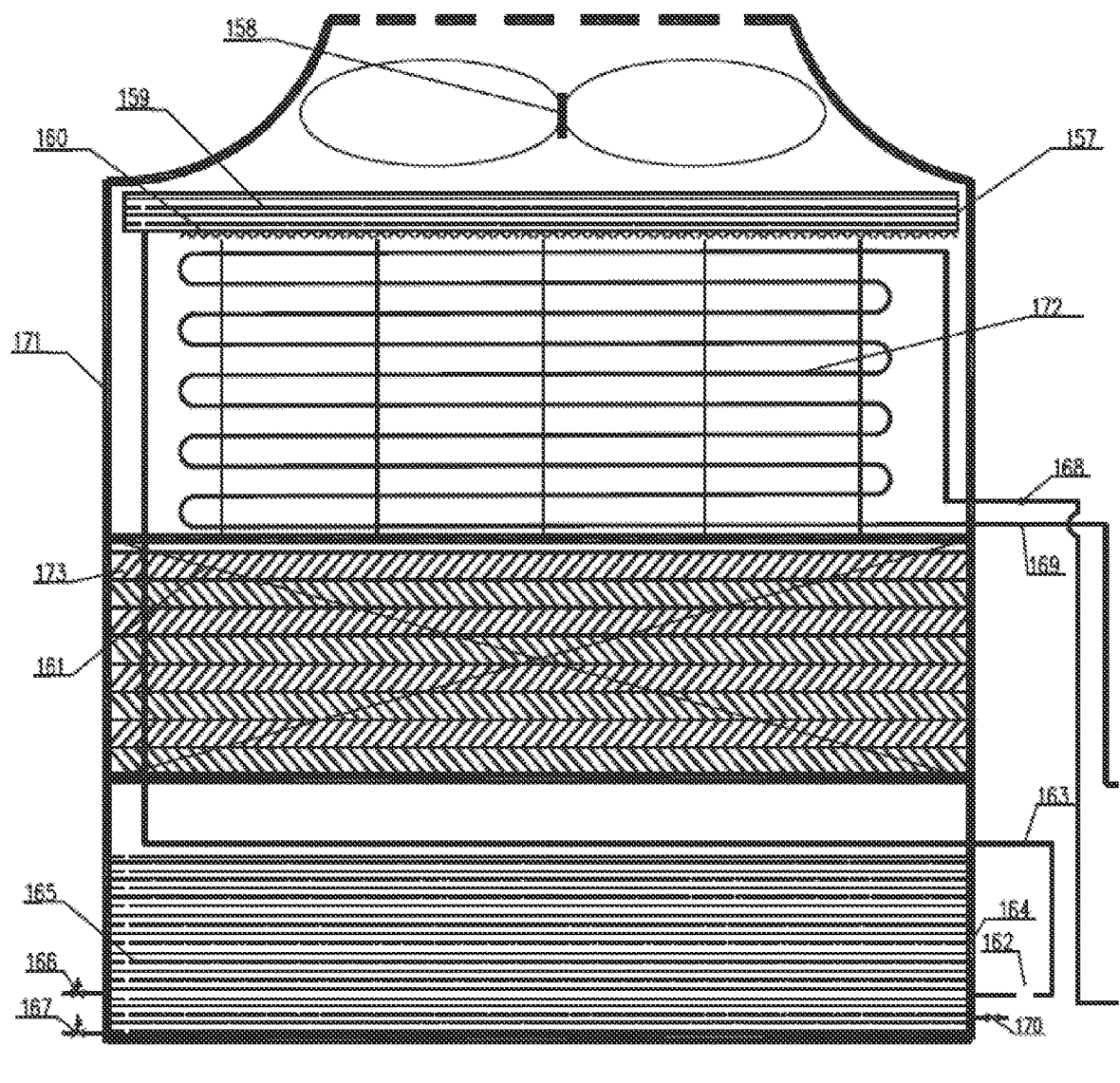
FIG. 15 with partial views FIGS. 15A-15C provide a schematic diagram of an embodiment of an ice crystal chilled water energy storage closed countercurrent energy tower heat pump air-conditioning system of the present application.
Figure 15B:
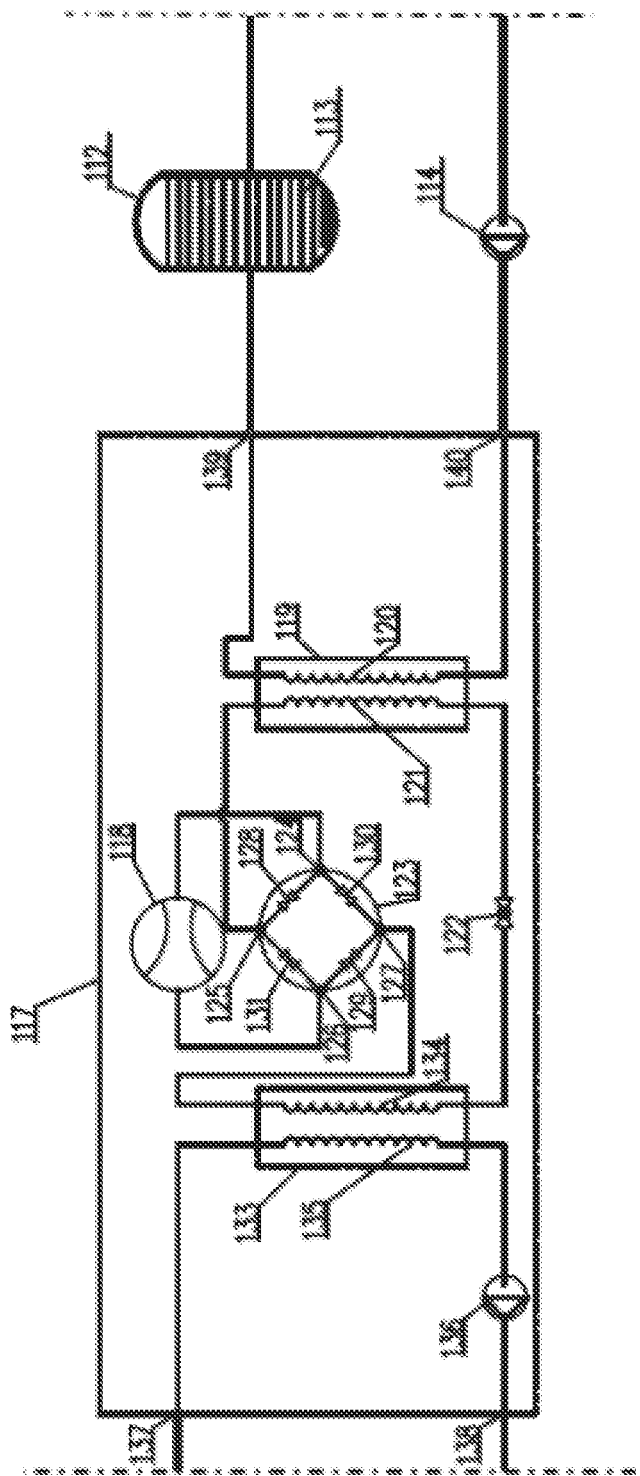
Figure 15C:
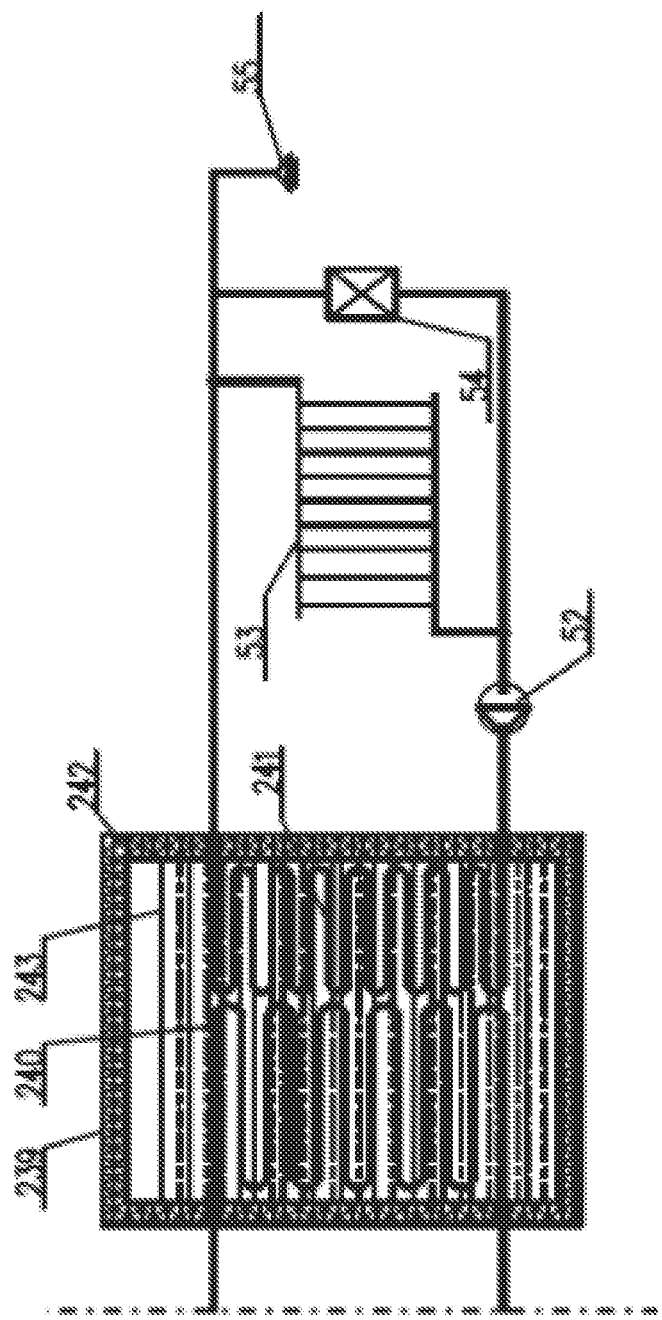

FIG. 15 is a schematic diagram of an embodiment of an ice crystal chilled water energy storage closed countercurrent energy tower heat pump air-conditioning system of the present application. In FIG. 15, the closed energy tower heat pump ice crystal cold storage/water heat storage system is also composed of a closed energy tower 171 and the spraying pump 162.

The closed energy tower 171 is composed of the tower spraying pump 162, the anti-freezing solution/water reservoir 164, the coil heat exchanger 172, the spraying apparatus 157, the closed tower fan 158 and a tower filler 173.

A bottom portion of the closed energy tower 154 is provided with an anti-freezing solution/water reservoir 164, one end of the tower spraying pump 162 is connected to the anti-freezing solution/water reservoir 164 and communicated with the anti-freezing solution/water 165, the other end of the tower spraying pump 162 is connected to the spraying apparatus 157 and communicated with an anti-freezing solution or water 159 in the spraying apparatus 157, and the closed tower fan 158 is arranged at an upper portion of the spraying apparatus 157.

FIG. 15 is only different from FIG. 14 in that a heat exchange direction between air and spraying water in the energy tower is different. The heat exchange between the air flow direction and spraying liquid shown in FIG. 15 is reverse to the air flow direction and spraying liquid shown in FIG. 14, so it is called the countercurrent energy tower. The resting parts are completely the same.

Figure 16A:
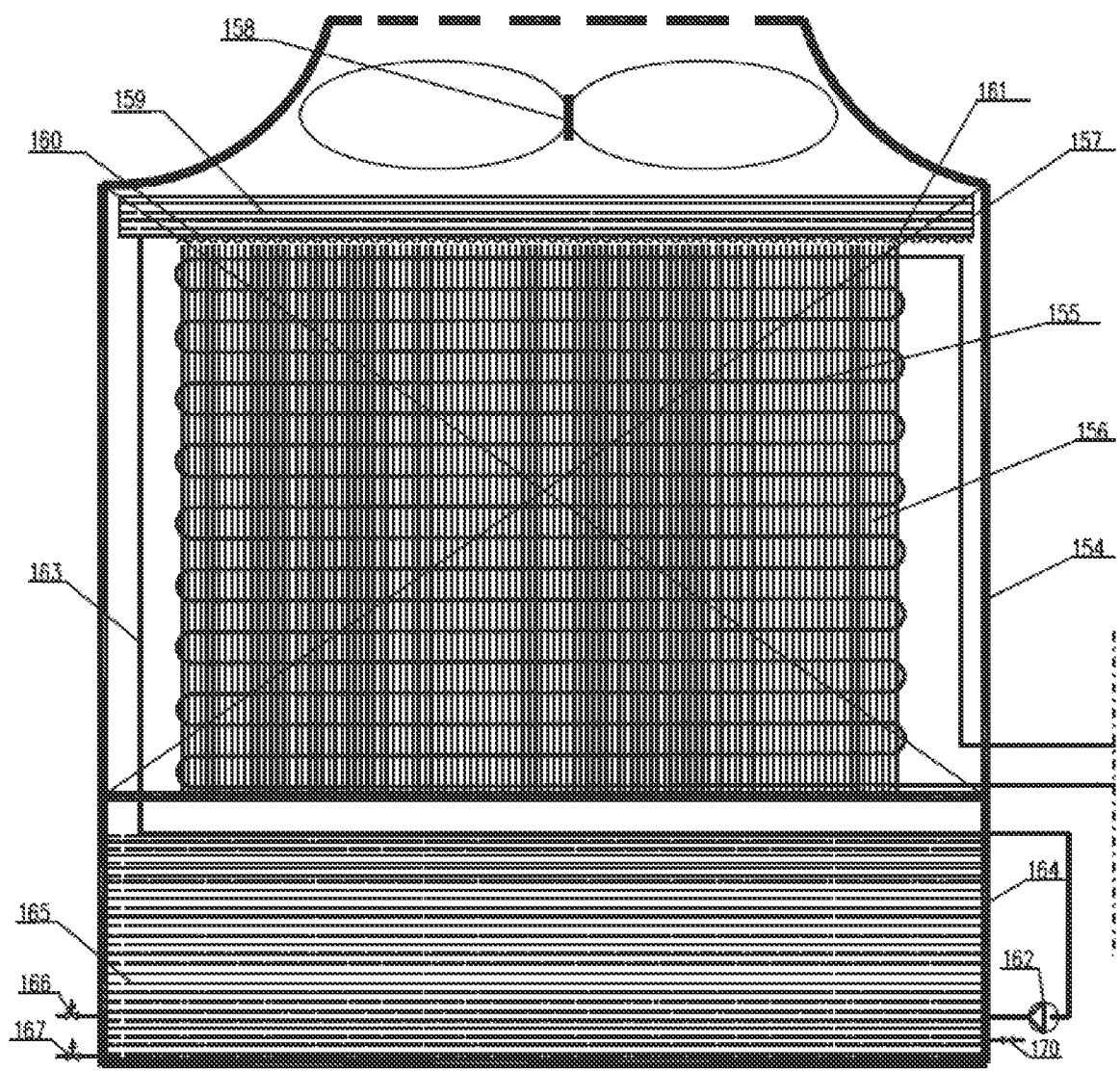
FIG. 16 with partial views FIGS. 16A-16C provide a schematic diagram of an embodiment of an ice crystal chilled water energy storage primary heat exchange closed cross-flow energy tower heat pump air-conditioning system of the present application.
Figure 16B:
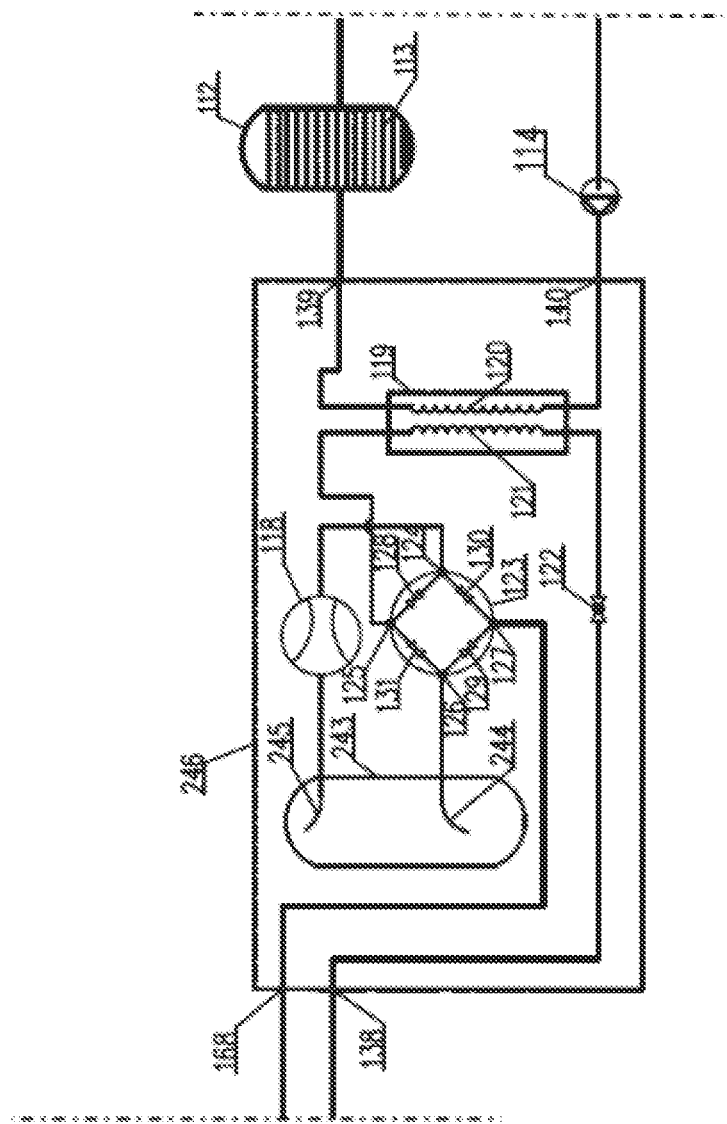
Figure 16C:
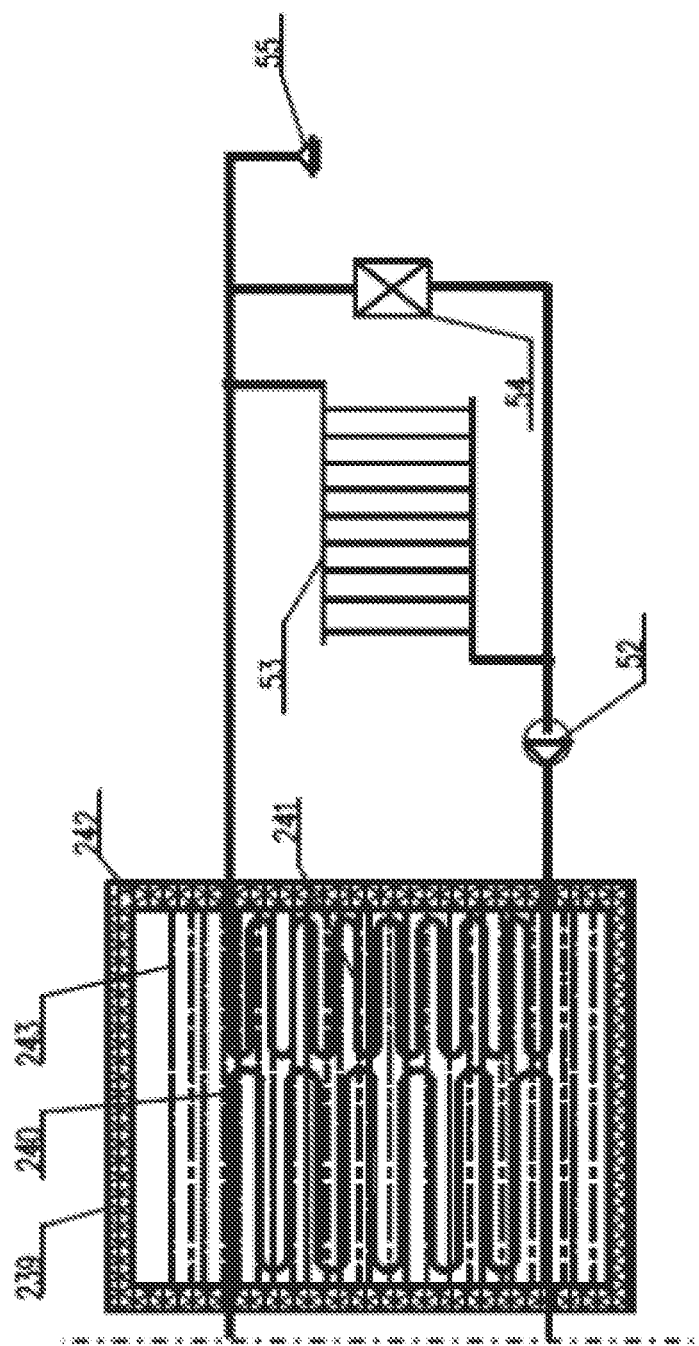

FIG. 16 is a schematic diagram of an embodiment of an ice crystal chilled water energy storage primary heat exchange closed cross-flow energy tower heat pump air-conditioning system of the present application. In FIG. 16, the electric energy storage apparatus is composed of a primary heat exchange closed cross-flow energy tower heat pump ice crystal cold storage/water heat storage system configured with a heat pump unit 246, and a gas-liquid separator 243.

The difference between the primary heat exchange closed cross-flow energy tower heat pump air-conditioning system in FIG. 16 and those systems in FIG. 4, FIG. 14 and FIG. 15 is that the latter three embodiments belong to a secondary heat exchange structure, because the refrigerating agent circulation heat exchange in FIG. 14 and FIG. 15 completes the primary heat exchange through the refrigerating agent heat exchange side 134 of the evaporator/condenser 133 and the water heat exchange side 135 of the evaporator/condenser 133. Then, the water heat exchange side 135 of the evaporator/condenser 133 circulates the anti-freezing solution or water sprayed through the wall and the outer wall of the coil heat exchanger 155 or the coil heat exchanger 172 through the water source circulating pump 136, and completes the secondary heat exchange with the air circulated by the tower fan 158.

In this way, the refrigerating agent passes through the outer wall of the coil heat exchanger 172 and the spraying liquid to complete the secondary heat exchange process with air, which will lose some energy. As we all know, each heat exchange will produce a heat exchange loss of 2° ° C. to 5° C., and the efficiency of the primary heat exchange is much higher than that of the secondary heat exchange. The efficiency of extracting the air energy from all the primary heat exchange energy towers in FIG. 16 is much higher than that of the secondary energy towers in FIGS. 13, 14 and 15.

The heat pump unit 246 is connected to the interface 126 of the four-way reversing valve through an air inlet interface 244 of the gas-liquid separator 243, an air exhaust interface 245 of the gas-liquid separator 243 is connected to the air suction end of the refrigeration compressor 118, the interface 127 of the four-way reversing valve is connected to one end of the coil heat exchanger 155, the other end of the coil heat exchanger 155 is connected to one end of the refrigerating agent heat exchange side 121 of the condenser/evaporator 119 through the expansion valve 122, and the other end of the refrigerating agent heat exchange side 121 of the condenser/evaporator 119 is connected to the interface 125 of the four-way reversing valve. The gas-liquid separator 243 is configured so that the refrigerating agent liquid which is not completely evaporated by the coil heat exchanger 155 or the coil heat exchanger 172 enters the gas-liquid separator 243 for precipitation first, and the gaseous refrigerating agent enters the air suction end of the refrigeration compressor 118 through the air exhaust interface 245 of the gas-liquid separator 243, so as to ensure that all the gas is sucked by the compressor, so as to prevent the refrigerating agent liquid impact and ensure the safe and reliable operation of the refrigeration compression circulation.

Figure 17A:
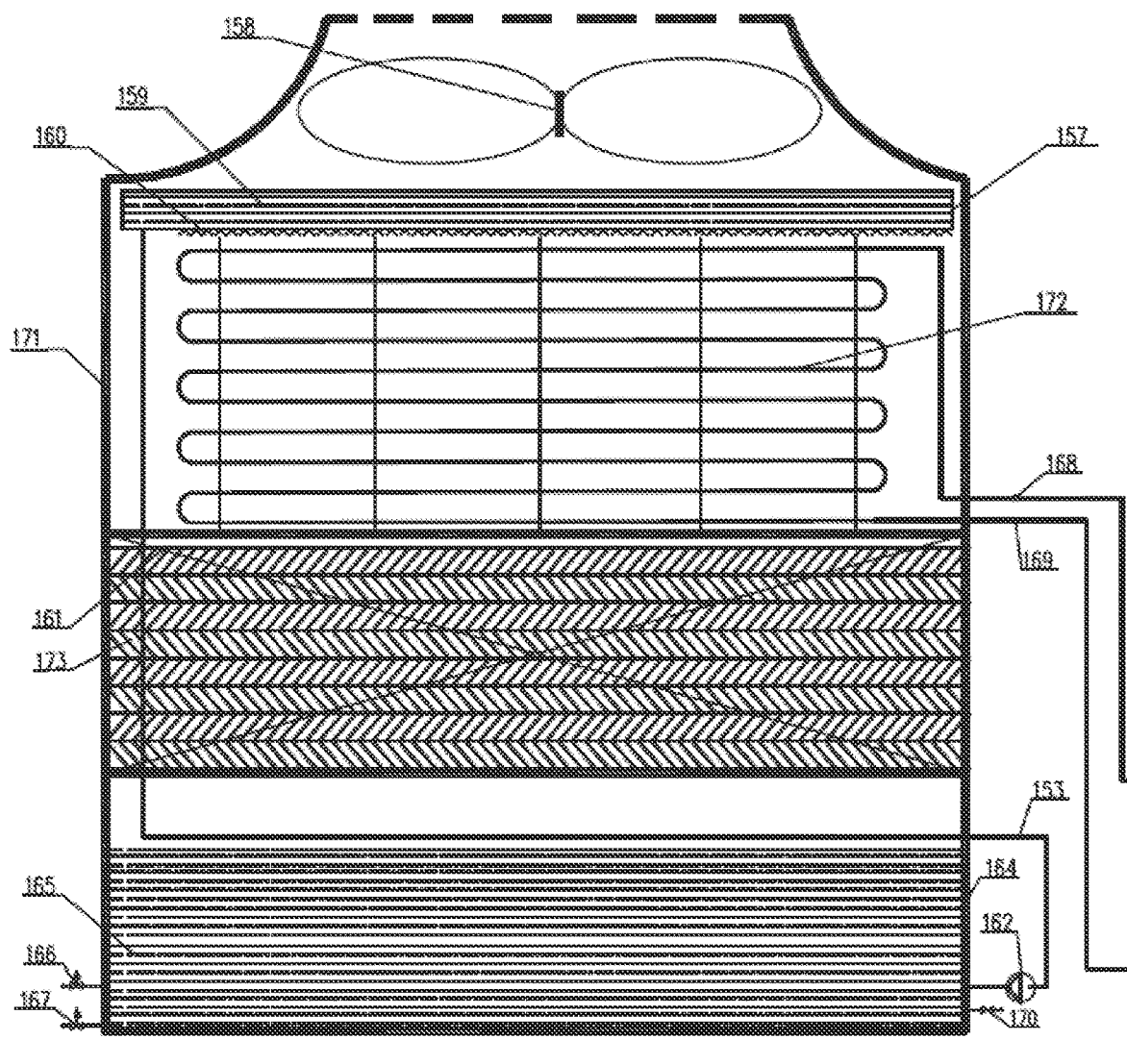
FIG. 17 with partial views FIGS. 17A-17C provide a schematic diagram of an embodiment of an ice crystal chilled water energy storage primary heat exchange closed countercurrent energy tower heat pump air-conditioning system of the present application.
Figure 17B:
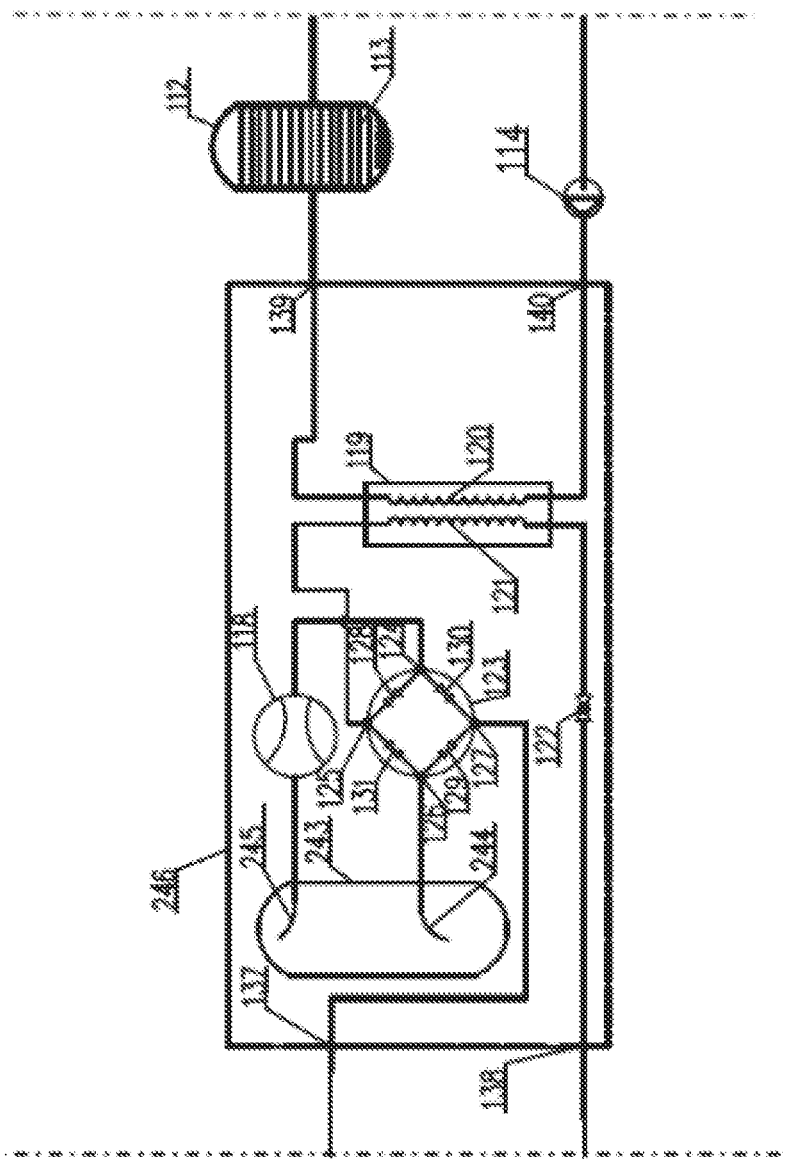
Figure 17C:
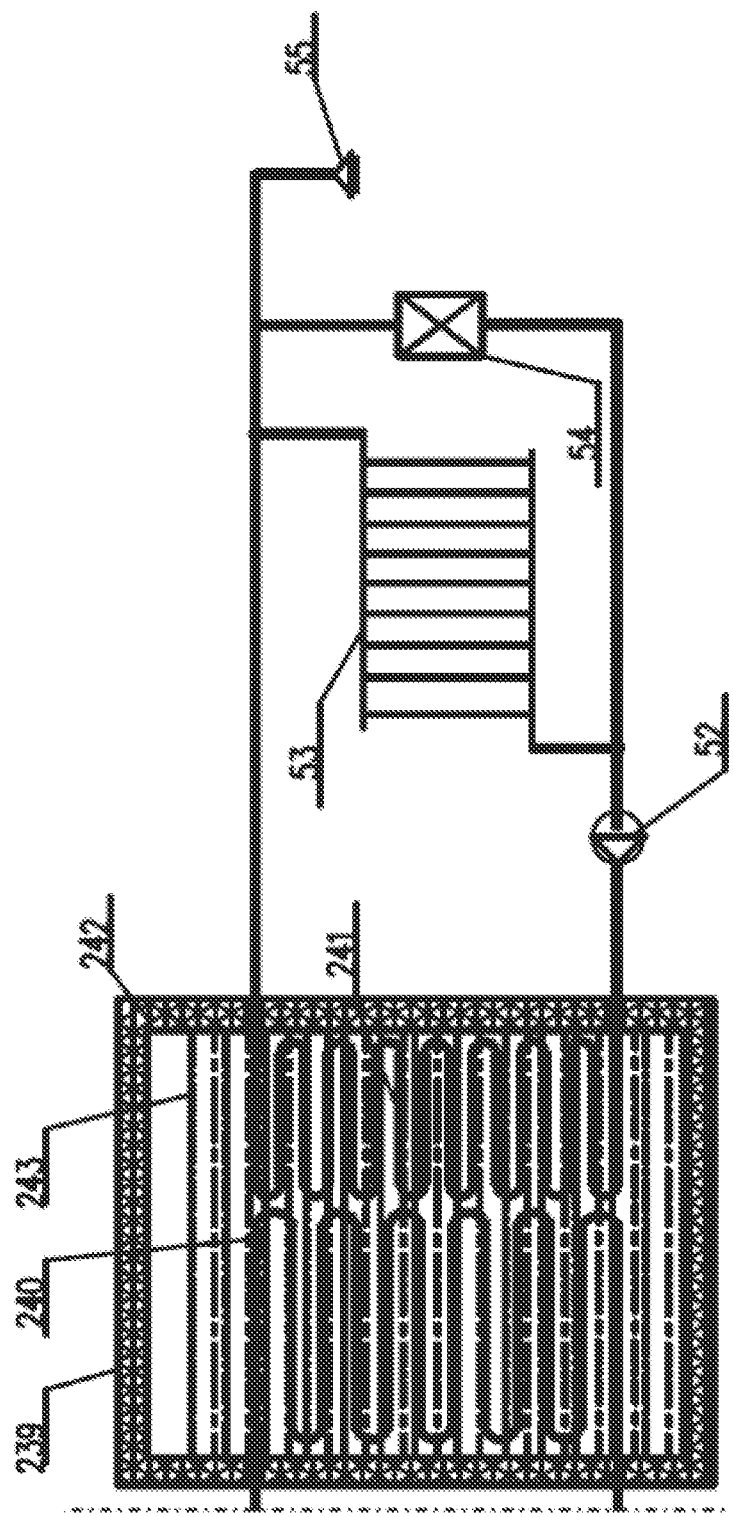

FIG. 17 is a schematic diagram of an embodiment of an ice crystal chilled water energy storage primary heat exchange closed countercurrent energy tower heat pump air-conditioning system of the present application. FIG. 17 also shows a primary heat exchange closed energy tower heat pump ice crystal cold storage/water heat storage system.

The electric energy storage apparatus is composed of a primary heat exchange closed countercurrent energy tower heat pump ice crystal cold storage/water heat storage system configured with the heat pump unit 246 and the gas-liquid separator 243.

One end of the coil heat exchanger 172 is connected to the interface 127 of the four-way reversing valve, the other end of the coil heat exchanger 172 is connected to one end of the refrigerating agent heat exchange side 121 of the condenser/evaporator 119 through the expansion valve 122, and the other end of the refrigerating agent heat exchange side 121 of the condenser/evaporator 119 is connected to the interface 125 of the four-way reversing valve.

Figure 18A:
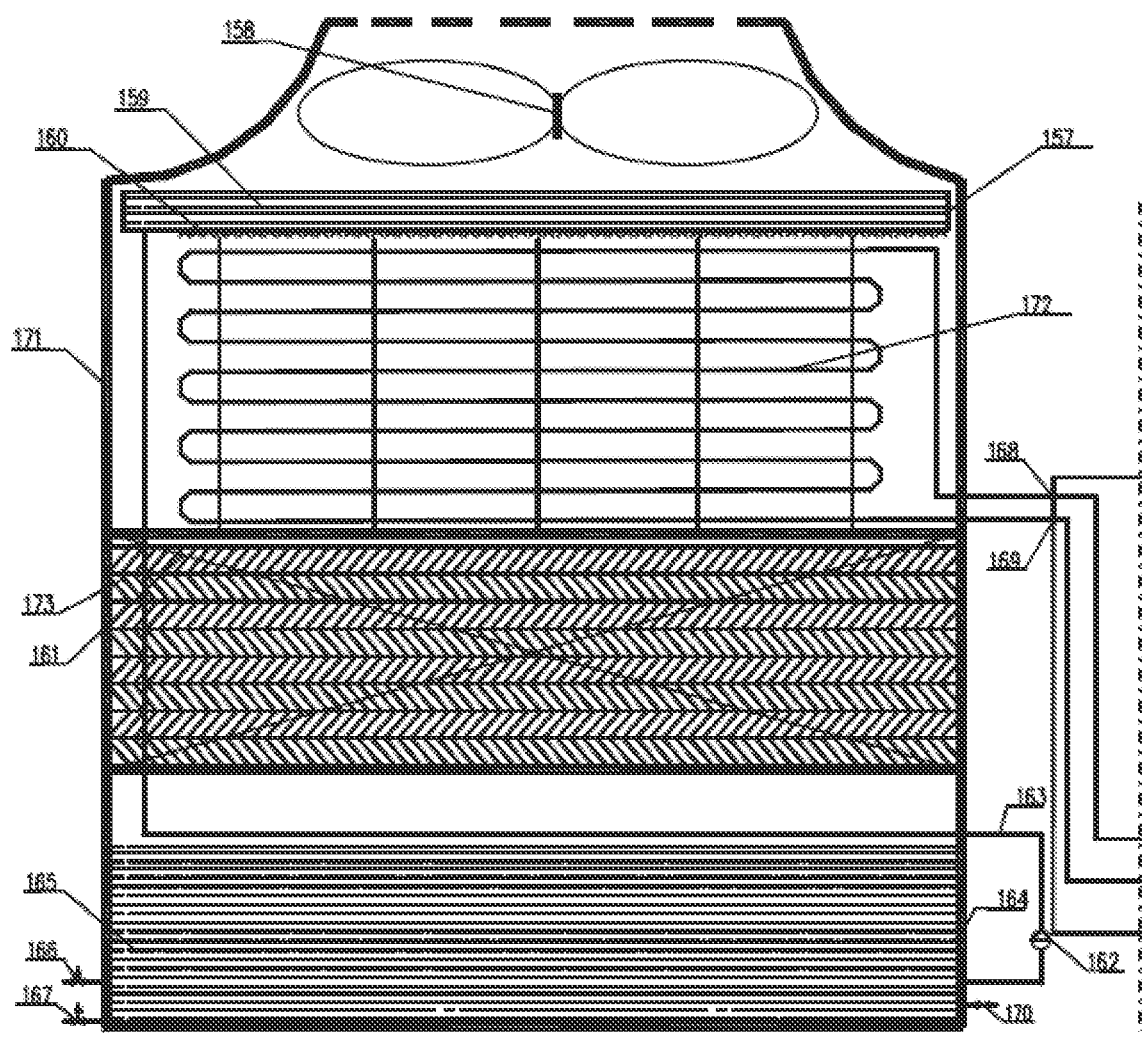
FIG. 18 with partial views FIGS. 18A-18C provide a schematic diagram of an embodiment of an ice crystal chilled water energy storage two-unit integrated machine room type energy tower heat pump air-conditioning system of the present application.
Figure 18B:
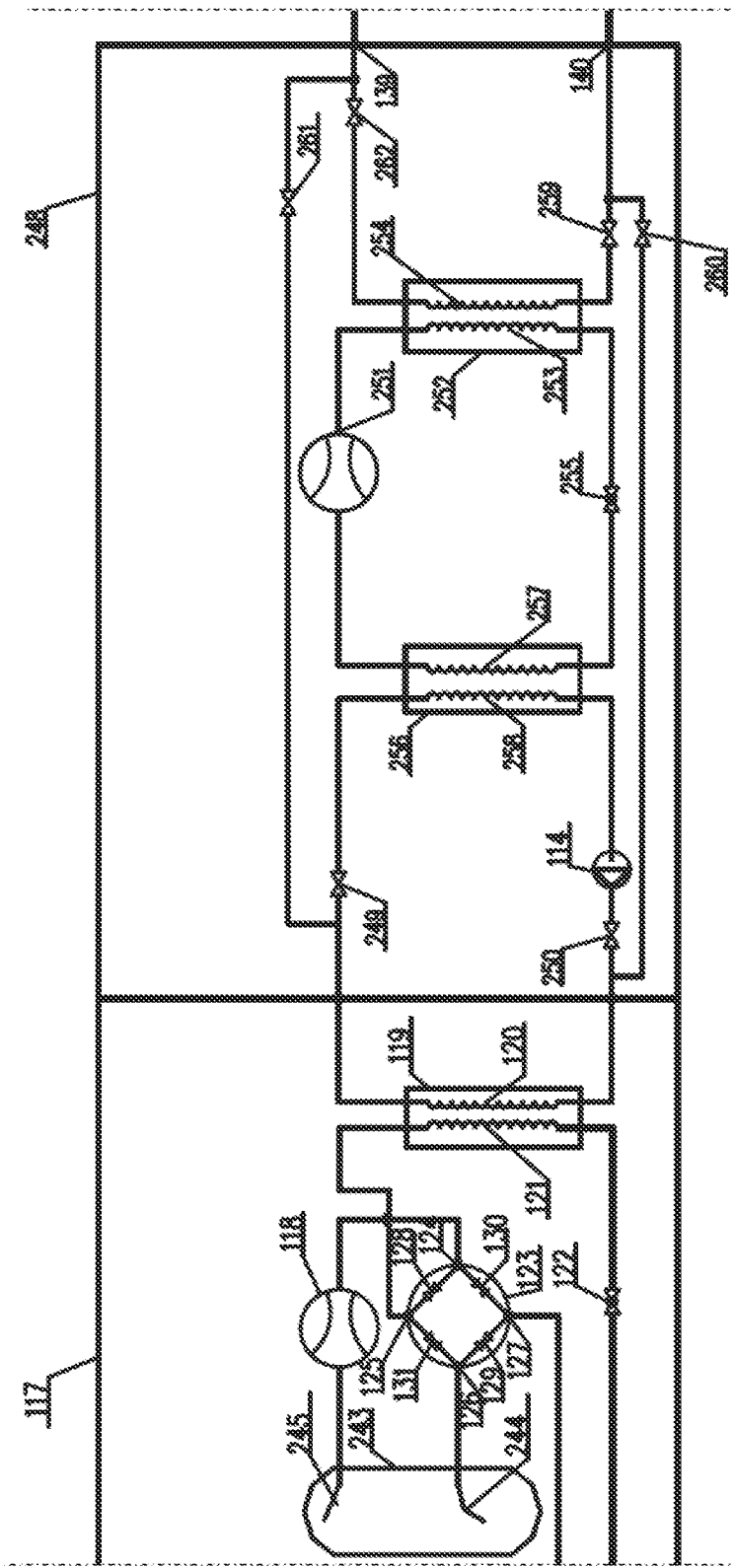
Figure 18C:
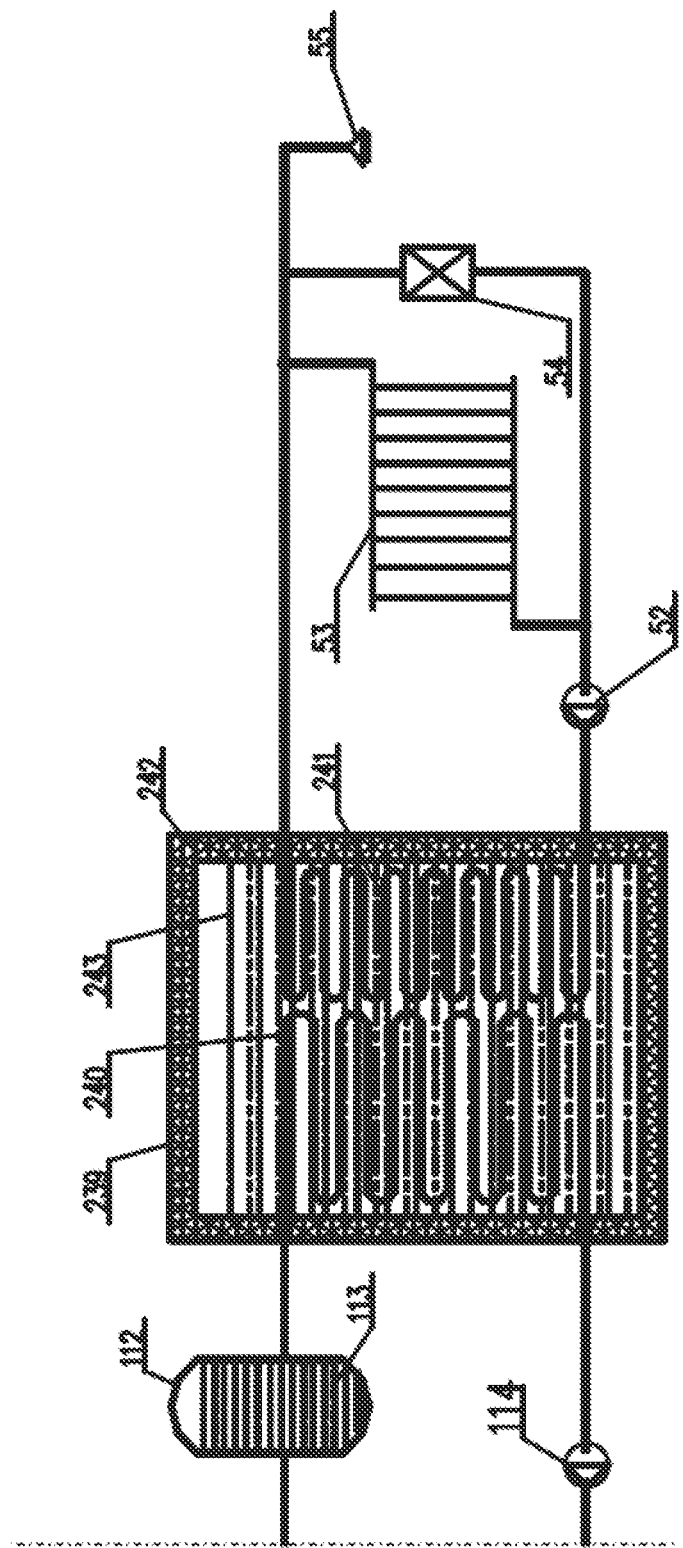

FIG. 18 is a schematic diagram of an embodiment of an ice crystal chilled water energy storage two-unit integrated machine room type energy tower heat pump air-conditioning system of the present application. The air-conditioning system shown in this figure is based on the air-conditioning system shown in FIG. 17, and a second-stage pump unit 248 is added.

The second-stage pump unit 248 comprises a second compressor 251, a condenser 252, a second expansion valve 255, an evaporator 256, and single and double-stage changeover valves 249, 250, 259, 260, 261 and 262.

One end of the single and double-stage changeover valve 250 is respectively connected to one end of the water heat exchange side 120 of the condenser/evaporator 119 of the heat pump unit 117 and one end of the single and double-stage changeover valve 260, the other end of the water heat exchange side 120 of the condenser/evaporator 119 of the heat pump unit 117 is respectively connected to one end of the single and double-stage changeover valve 249 and one end of the single and double-stage changeover valve 261, the other end of the single and double-stage changeover valve 250 is connected to one end of a water heat exchange side 258 of the evaporator 256 of the second-stage pump unit 248 through the output circulating pump 114, the other end of the water heat exchange side 258 of the evaporator 256 of the second-stage pump unit 248 is connected to the other end of the single and double-stage changeover valve 249, one end of a refrigerating agent heat exchange side 257 of the evaporator 256 of the second-stage pump unit 248 is connected to an air suction end of the second refrigeration compressor 251, the other end of the refrigerating agent heat exchange side 257 of the evaporator 256 of the second-stage pump unit 248 is connected to one end of a refrigerating agent heat exchange side 253 of the condenser 252 through the second expansion valve 255, the other end of the refrigerating agent heat exchange side 253 of the condenser 252 is connected to an air exhaust end of the second refrigeration compressor 251, one end of a water heat exchange side 254 of the condenser 252 is respectively connected to the other end of the single and double-stage changeover valve 260 and one end of the circulating pump 114 through one end of the single and double-stage changeover valve 259, the other end of the circulating pump 114 is connected to one end of a freezing coil heat exchanger 240, the other end of the freezing coil heat exchanger 240 is respectively connected to one end of the single and double-stage changeover valve 262 and the other end of the single and double-stage changeover valve 261 through the coupled circulating tank 112, the other end of the single and double-stage changeover valve 262 is connected to one end of a water heat exchange side 254 of the condenser 252 of the second-stage pump unit 248, and the other end of the water heat exchange side 254 of the condenser 252 of the second-stage pump unit 248 is connected to the other end of the single and double-stage changeover valve 259.

Figure 19A:
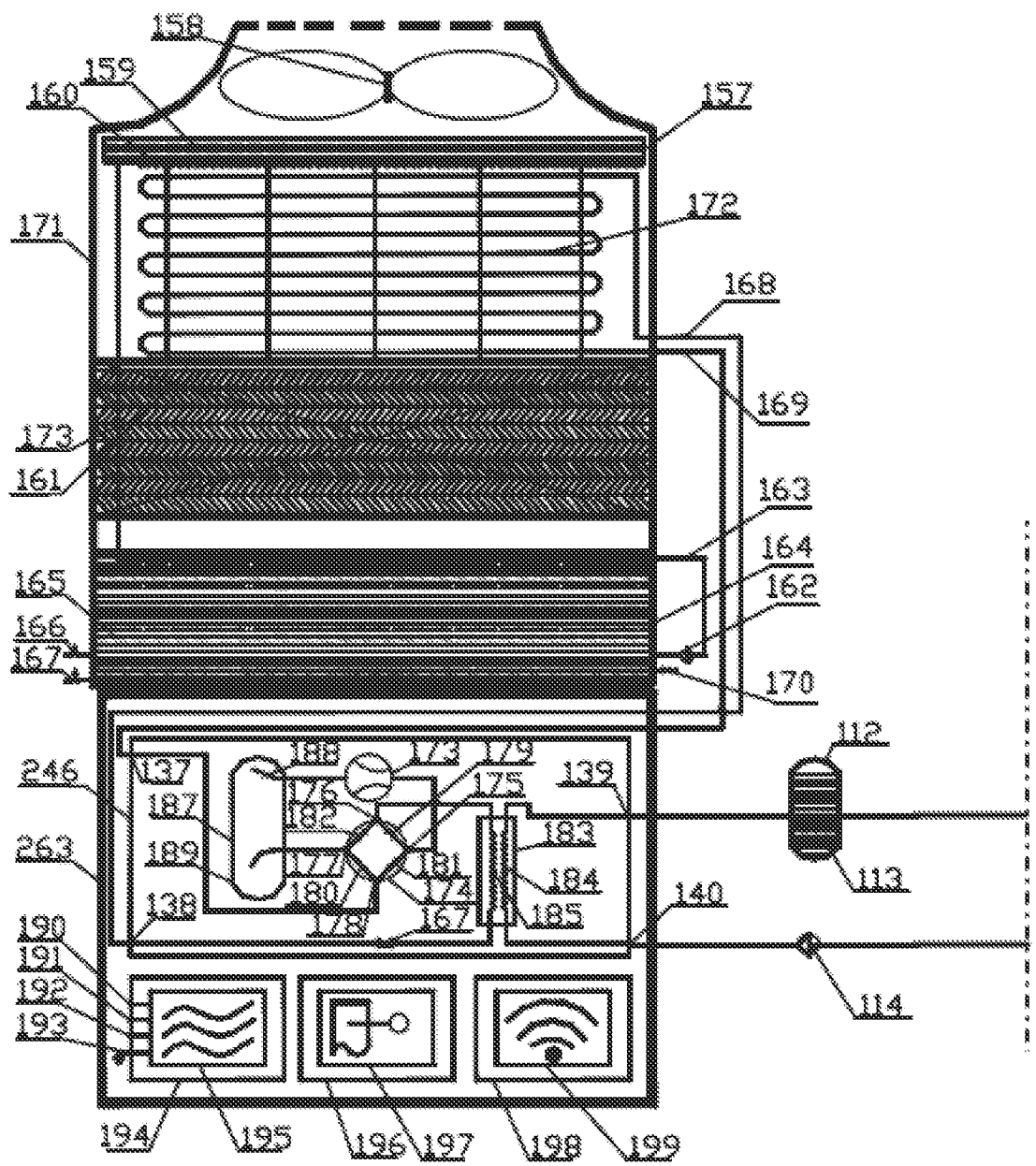
FIG. 19 with partial views FIGS. 19A-19B provide a schematic diagram of an embodiment of an ice crystal chilled water energy storage integrated machine room type energy tower heat pump air-conditioning system of the present application.
Figure 19B:
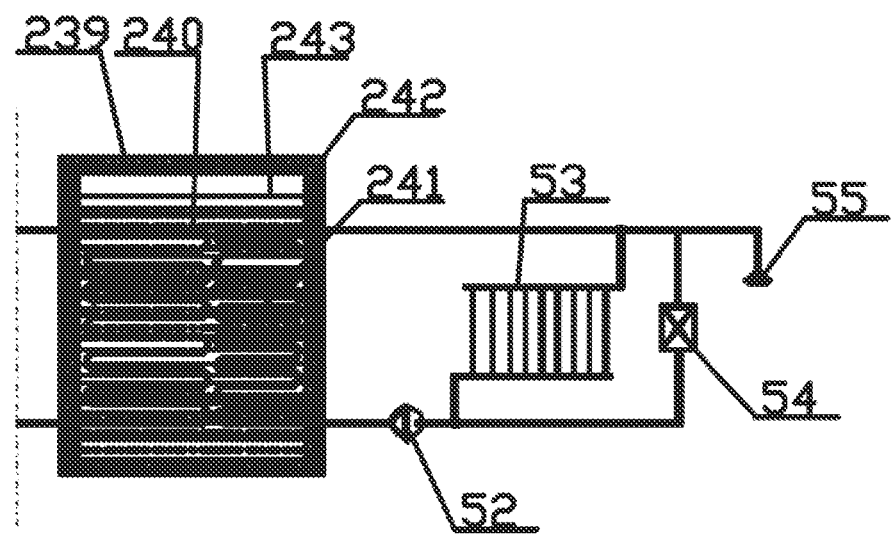

FIG. 19 is a schematic diagram of an embodiment of an ice crystal chilled water energy storage integrated machine room type energy tower heat pump air-conditioning system of the present application. In FIG. 19 a configured integrated machine room 263, the refrigeration unit 95, the heat pump unit 117, the heat pump unit 246, the second-stage pump unit 248, a configured power distribution apparatus 194, a detection automatic control apparatus 196, a remote monitoring apparatus 198, the cooling tower 104, the energy tower 147, the closed energy tower 154 and the closed energy tower 171 are comprised.

The power distribution apparatus 194 comprises a power distribution cabinet 195, an input end of the power distribution cabinet 195 is connected to three-phase power A, B and C of the wind and photovoltaic power grid 1 through power interfaces 190, 191, 192 and 193, and an output end of the power distribution cabinet 195 is connected to a power input end of an electric device in the integrated machine room 263.

The detection automatic control apparatus 196 comprises a detection and/or automatic control cabinet 197, and the detection and/or automatic control cabinet 197 is connected to a detection and control device end needed in the integrated machine room 263.

The remote monitoring apparatus 198 comprises a mobile communication 3G or 4G or 5G or wireless local area network remote monitoring apparatus 199, and the mobile communication 3G or 4G or 5G or wireless local area network remote monitoring apparatus 199 is connected to the detection and/or automatic control cabinet 197 in the integrated machine room 263.

The heat pump unit 117, the configured power distribution apparatus 194, the detection automatic control device 196 and the remote monitoring apparatus 198 are all configured in the integrated machine room 263. And all the manufacturing and installation are completed in a factory, realizing the modernization of installation to replace the on-site construction and installation by low-level migrant workers, which can not only save raw materials, but also save labor costs and improve the efficiency, level and quality of installation. All refrigeration equipment, energy tower, power distribution, automatic control and even remote monitoring transmission system are configured in the integrated machine room and leave the factory as a whole. It is especially suitable for the application of distributed photovoltaic power generation and photovoltaic energy storage systems, which can completely realize unmanned operation of the computer room and remote monitoring, and all the data of operating conditions, fault details and operating conditions are remotely transmitted to users and engineering experts for remote communication and processing.

The cooling tower 104 or the energy tower 147 or the closed energy tower 154 or the closed energy tower 171 is arranged at one side of the integrated machine room 263 or above the integrated machine room 263, and the whole integrated manufacturing should also consider the limitation of ultra-high transportation and ultra-wide width and even the convenience of site hoisting. In FIG. 19, the overall machine room structure is more suitable for photovoltaic household distributed light storage and charging applications.

It should be finally noted that the above embodiments are only used to illustrate the technical solutions of the present application, rather than limiting the present application. Although the present application has been described in detail with reference to the foregoing embodiments, those of ordinary skills in the art should understand that: the technical solutions described in the foregoing embodiments can be still modified, or some or all of the technical features can be equivalently replaced. However, these modifications or substitutions do not make the essence of the corresponding technical solutions depart from the scope of the technical solutions of various embodiments of the present application.

We claim:

1. A photovoltaic energy storage power station, comprising a wind and photovoltaic power grid (1) and an electric energy storage apparatus (2); wherein:
the wind and photovoltaic power grid (1) generates electricity by wind and photovoltaic power and is integrated into a public grid system; and
an input end of the electric energy storage apparatus (2) is connected to the wind and photovoltaic power grid (1), absorbs electric energy of the wind and photovoltaic power grid (1) as needed by using the electric energy storage apparatus (2), and stores the electric energy in an energy storage mode, and an output end of the electric energy storage apparatus (2) supplies the stored energy to a user;
the photovoltaic energy storage power station further comprises a heating air-conditioning system (4), a charging pile (5), and a light and/or load (6);
the wind and photovoltaic power grid (1) is connected to the charging pile (5) and an input end of the light and/or load (6);
the output end of the electric energy storage apparatus (2) is connected to an input end of the heating air-conditioning system (4);
the heating air-conditioning system (4) comprises a heating system, a domestic hot water system and a bathing system;
the charging pile (5) comprises a new energy vehicle and electric vehicle charging pile; and
the light and/or load (6) comprises an indoor and outdoor lighting system and a power system utilization terminal;
the electric energy storage apparatus (2) further comprises a phase-change liquid-air cold storage system;
the phase-change liquid-air cold storage system comprises an air compressor (63), an air reservoir (66), a heat exchange apparatus (69), a heat exchanger (71), an expander (81), a liquid-air reservoir (84), an inner reservoir (85) and liquid-air (88); and
an input end of the air compressor (63) is communicated with air, an output end of the air compressor (63) is connected to an input end of the air reservoir (66), an output end of the air reservoir (66) is connected to a subsequent device in two passages, a first passage is connected to one end of a first heat exchange side (72) of the heat exchanger (71) in the heat exchange apparatus (69), the other end of the first heat exchange side (72) is connected to the liquid-air reservoir (84), a second passage is connected to one end of a second heat exchange side (73) of the heat exchanger (71) in the heat exchange apparatus (69), the other end of the second heat exchange side (73) of the heat exchanger (71) is connected to an input end of the expander (81), an output end of the expander (81) is connected to one end of a third heat exchange side (74) of the heat exchanger (71), and the other end of the third heat exchange side (74) of the heat exchanger (71) in the heat exchange apparatus (69) is connected to an input end of the air compressor (63).

2. The photovoltaic energy storage power station according to claim 1, wherein the electric energy storage apparatus (2) comprises a phase-change heat storage apparatus (7);
the phase-change heat storage apparatus (7) comprises a phase-change heat storage material (8), at least one set of electric heating apparatuses (9, 10 and 11) and a heating coil heat exchanger (15);
the phase-change heat storage material (8) is stored in the phase-change heat storage apparatus (7), the electric heating apparatuses (9, 10 and 11) are immersed in the phase-change heat storage material (8), and power interfaces A, B and C of the electric heating apparatuses (9, 10 and 11) are connected to the wind and photovoltaic power grid (1); and
the heating coil heat exchanger (15) is immersed in the phase-change heat storage material (8), and coil heat exchanger interfaces (16 and 17) of the heating coil heat exchanger (15) are connected to the heating air-conditioning system (4).

3. The photovoltaic energy storage power station according to claim 1, wherein the electric energy storage apparatus (2) comprises a sensible heat storage apparatus (18);
the sensible heat storage apparatus (18) comprises a sensible heat storage material (19), at least one set of electric heating apparatuses (20, 21 and 22) and a heating coil heat exchanger (23);

the electric heating apparatuses (20, 21 and 22) are immersed in the sensible heat storage material (19), and power interfaces A, B and C of the electric heating apparatuses (20, 21 and 22) are connected to the wind and photovoltaic power grid (1); and the heating coil heat exchanger (23) is immersed in the sensible heat storage material (19), and coil heat exchanger interfaces (24 and 25) of the sensible heat storage material (19) are connected to a user-side heating and domestic hot water interface.

4. The photovoltaic energy storage power station according to claim 1, wherein the electric energy storage apparatus (2) comprises a sensible heat reservoir (26), a sensible heat storage material (27), at least one set of electric heating apparatuses (28, 29 and 30) and a heating coil heat exchanger (31);

the electric heating apparatuses (28, 29 and 30) are immersed in the sensible heat storage material (27), and power interfaces A, B and C of the electric heating apparatuses (28, 29 and 30) are connected to the wind and photovoltaic power grid (1); and the heating coil heat exchanger (31) is immersed in the sensible heat storage material (27), and coil heat exchanger interfaces (32 and 33) of the heating coil heat exchanger (31) are connected to the heating air-conditioning system (4).

5. The photovoltaic energy storage power station according to claim 2, wherein the electric energy storage apparatus (2) further comprises the phase-change heat storage apparatus (7), an organic salt (57), a heat-conducting oil or organic solution (58), water (59), a sensible heat storage buffer apparatus (34), a sensible heat storage output apparatus (43), a coupled circulating expansion tank (41), a coupled circulating pump (42), an air-conditioning output circulating pump (52) and the heating air-conditioning system (4);

the phase-change heat storage apparatus (7) comprises a molten salt (57), electric heating apparatuses (9, 10 and 11) and a heating coil heat exchanger (15), the electric heating apparatuses (9, 10 and 11) are immersed in the molten salt (57), and the heating coil heat exchanger (15) is immersed in the molten salt (57);

the sensible heat storage buffer apparatus (34) comprises the heat-conducting oil (58), an input coil heat exchanger (35) and an output coil heat exchanger (38), the input coil heat exchanger (35) is immersed in the heat-conducting oil (58), and the output coil heat exchanger (38) is immersed in the heat-conducting oil (58);

the sensible heat storage output apparatus (43) comprises the water (59), an input coil heat exchanger (44) and an output coil heat exchanger (47), the input coil heat exchanger (44) is immersed in the water (59), and the output coil heat exchanger (47) is immersed in the water (59); and one end of the heating coil heat exchanger (15) of the phase-change heat storage apparatus (7) is connected to one end of the coupled circulating expansion tank (41) through the interface (16) of the heating coil heat exchanger, the other end of the coupled circulating expansion tank (41) is connected to one end of the input coil heat exchanger (35) of the sensible heat storage buffer apparatus (34) through an interface (36) of the input coil heat exchanger, the other end of the input coil heat exchanger (35) of the sensible heat storage buffer apparatus (34) is connected to one end of the coupled circulating pump (42) through an interface (37) of the input coil heat exchanger, the other end of the coupled circulating pump (42) is connected to the other end of the heating coil heat exchanger (15) through the interface (17) of the heating coil heat exchanger, one end of the output coil heat exchanger (38) is connected to one end of the coupled circulating expansion tank (41) through an interface (39) of the output coil heat exchanger, the other end of the coupled circulating expansion tank (41) is connected to one end of the input coil heat exchanger (44) of the sensible heat storage output apparatus (43) through an interface (45) of the input coil heat exchanger, the other end of the input coil heat exchanger (44) is connected to one end of the coupled circulating pump (42) through an interface (46) of the input coil heat exchanger), the other end of the coupled circulating pump (42) is connected to the other end of the output coil heat exchanger (38) through an interface (40) of the output coil heat exchanger, one end of the output coil heat exchanger (47) of the sensible heat storage output apparatus (43) is respectively connected to one end of the heating air-conditioning system (4) through an interface (48) of the output coil heat exchanger, and the other end of the output coil heat exchanger (47) of the sensible heat storage output tank (43) is connected to the other end of the heating air-conditioning system (4) through the output circulating pump (52).

6. The photovoltaic energy storage power station according to claim 5, wherein the electric energy storage apparatus (2) further comprises the sensible heat storage apparatus (18), the heat-conducting oil (58), the water (59), the sensible heat storage buffer apparatus (34), the sensible heat storage output apparatus (43), the coupled circulating expansion tank (41), the coupled circulating pump (42), the air-conditioning output circulating pump (52) and the heating air-conditioning system (4);

one end of the heating coil heat exchanger (23) of the sensible heat storage apparatus (18) is connected to one end of the coupled circulating expansion tank (41) through the interface (24) of the heating coil heat exchanger, the other end of the coupled circulating expansion tank (41) is connected to one end of the input coil heat exchanger (35) through the interface (36) of the input coil heat exchanger, the other end of the input coil heat exchanger (35) is connected to one end of the coupled circulating pump (42) through the interface (37) of the input coil heat exchanger, and the other end of the coupled circulating pump (42) is connected to the other end of the heating coil heat exchanger (23) through the interface (25) of the heating coil heat exchanger; and one end of the output coil heat exchanger (38) of the sensible heat storage buffer apparatus (34) is connected to one end of the coupled circulating expansion tank (41) through the interface (39) of the output coil heat exchanger, the other end of the coupled circulating expansion tank (41) is connected to one end of the input coil heat exchanger (44) of the sensible heat storage output apparatus (43) through the interface (45) of the input coil heat exchanger, the other end of the input coil heat exchanger (44) is connected to one end of the coupled circulating pump (42) through the interface (46) of the input coil heat exchanger, the other end of the coupled circulating pump (42) is connected to the other end of the output coil heat exchanger (38) through the interface (40) of the output coil heat exchanger, one end of the output coil heat exchanger (47) of the sensible heat storage output apparatus (43) is connected to one end of the heating air-conditioning system (4) through the interface (48) of the output coil heat exchanger, and the other end of the output coil heat exchanger (47) of the sensible heat storage output tank (43) is connected to the other end of the heating air-conditioning system (4) through the output circulating pump (52).

7. The photovoltaic energy storage power station according to claim 5, wherein the electric energy storage apparatus (2) further comprises the sensible heat storage apparatus (26), the water (59), the sensible heat storage output apparatus (43), the coupled circulating expansion tank (50), the coupled circulating pump (51), the air-conditioning output circulating pump (52) and the heating air-conditioning system (4);

one end of the heating coil heat exchanger (31) of the sensible heat storage apparatus (26) is connected to one end of the coupled circulating expansion tank (50) through the interface (32) of the heating coil heat exchanger, the other end of the coupled circulating expansion tank (50) is connected to one end of the input coil heat exchanger (44) of the sensible heat storage output tank (43) through the interface (45) of the input coil heat exchanger, the other end of the input coil heat exchanger (44) is connected to one end of the coupled circulating pump (51) through the interface (46) of the input coil heat exchanger, and the other end of the coupled circulating pump (51) is connected to the other end of the heating coil heat exchanger (31) through the interface (33) of the heating coil heat exchanger; and one end of the output coil heat exchanger (47) of the sensible heat storage output apparatus (43) is connected to one end of the heating air-conditioning system (4) through the interface (48) of the output coil heat exchanger, and the other end of the output coil heat exchanger (47) of the sensible heat storage output tank (43) is connected to the other end of the heating air-conditioning system (4) through the output circulating pump (52).

8. The photovoltaic energy storage power station according to claim 1, wherein the phase-change liquid-air cold storage system further comprises a heat preservation water tank (90), a liquid-air release heat exchanger (92), chilled water (94), an air discharge port (93), the air-conditioning output circulating pump (52) and the heating air-conditioning system (4);

the chilled water (94) is arranged in the heat preservation water tank (90), the liquid-air release heat exchanger (92) is arranged and immersed in the chilled water (94), one end of the liquid-air release heat exchanger (92) is communicated with the liquid-air (88) in the inner reservoir (85) of the liquid-air reservoir (84) through a throttle valve (89), and one end of the liquid-air release heat exchanger (92) is communicated with the air discharge port (93); and one end of the air-conditioning output circulating pump (52) is connected to the heat preservation water tank (90) and communicated with the chilled water (94), the other end of the air-conditioning output circulating pump (52) is respectively connected to one end of the heating air-conditioning system (4), and the other end of the heating air-conditioning system (4) is connected to the heat preservation water tank (90) and communicated with the chilled water (94).

9. The photovoltaic energy storage power station according to claim 1, wherein the electric energy storage apparatus (2) further comprises an ice storage system;

the ice storage system comprises a refrigeration unit (95), a cooling tower (104), refrigerant circulating pumps (114-1 and 114-2), an ice reservoir (141), an ice-melting frozen water reservoir (207), a cooling water circulating pump (103), an air-conditioning output circulating pump (52) and the heating air-conditioning system (4);

the refrigeration unit (95) comprises a refrigeration compressor (96), a condenser (97), an expansion valve (102) and an evaporator (100);

the cooling tower (104) comprises a tower fan (105), a spraying apparatus (106), an air inlet (107) and cooling water (230), the tower fan (105) is arranged above the spraying apparatus (106), the spraying apparatus (106) is arranged between the tower fan (105) and the air inlet (107), the air inlet (107) is arranged above a liquid level of the cooling water (230), and the cooling water (230) is arranged below the cooling tower (104);

the ice reservoir (141) comprises an ice storage refrigerant heat exchange coil (144), an ice-melting heat exchange coil (146), an ice storage refrigerant circulating tank (112-1) and a refrigerant (113-1), and the refrigerant (113-1) is an anti-freezing solution;

the ice-melting frozen water reservoir (207) comprises a primary heat exchange side (209), a secondary heat exchange side (210), an ice-melting circulating tank (112-2) and a refrigerant (113-2), and the refrigerant (113-2) is an anti-freezing solution; and an air exhaust end of the refrigeration compressor (96) is connected to one end of a refrigerating agent heat exchange side (98) of the condenser (97), the other end of the refrigerating agent heat exchange side (98) of the condenser (97) is connected to one end of a refrigerating agent heat exchange side (264) of the evaporator (100) through the expansion valve (102), the other end of the refrigerating agent heat exchange side (264) of the evaporator (100) is connected to an air suction end of the refrigeration compressor (96), one end of a water heat exchange side (99) of the condenser (97) is connected to the spraying apparatus (106), the other end of the water heat exchange side (99) of the condenser (97) is connected to the cooling tower (104) through the cooling water circulating pump (103), and is communicated with the cooling water (230) in the cooling tower (104), one end of a water heat exchange side (101) of the evaporator (100) is connected to one end of the ice storage refrigerant circulating tank (112-1) and communicated with the refrigerant (113-1), the other end of the ice storage refrigerant circulating tank (112-1) is connected to one end of the ice storage refrigerant heat exchange coil (144), the other end of the ice storage refrigerant heat exchange coil (144) is connected to the other end of the water heat exchange side (101) of the evaporator (100) through the refrigerant circulating pump (114-1), one end of the ice-melting heat exchange coil (146) is connected to one end of the primary heat exchange side (209) of the ice-melting frozen water reservoir (207) through the ice-melting circulating tank (112-2) and communicated with the refrigerant (113-2), the other end of the primary heat exchange side (209) of the ice-melting frozen water reservoir (207) is connected to the other end of the ice-melting heat exchange coil (146) through the refrigerant circulating pump (114-2), one end of the secondary heat exchange side (210) of the ice-melting frozen water reservoir (207) is respectively connected to one end of the heating air-conditioning system (4), and the other end of the heating air-conditioning system (4) is connected to the other end of the secondary heat exchange side (210) of the ice-melting frozen water reservoir (207) through the air-conditioning output circulating pump (52).

10. The photovoltaic energy storage power station according to claim 9, wherein the electric energy storage apparatus (2) further comprises an organic solution cold storage system;
the heat pump organic solution cold storage system comprises the refrigeration unit (95), the cooling tower (104), an organic solution reservoir (231) and a sodium formate solution (232); and
one end of a first heat exchange side (233) in the organic solution reservoir (231) is connected to one end of the water heat exchange side (101) of the evaporator (100) through the coupled circulating tank (41), the other end of the water heat exchange side (101) of the evaporator (100) is connected to the other end of the first heat exchange side (233) in the organic solution reservoir (231) through the coupled circulating pump (114), one end of a second heat exchange side (234) in the organic solution reservoir (231) is respectively connected to one end of the heating air-conditioning system (4) through the air-conditioning output circulating pump (52), and the other end of the heating air-conditioning system (4) is connected to the other end of the second heat exchange side (234) in the organic solution reservoir (231).

11. The photovoltaic energy storage power station according to claim 9, wherein the electric energy storage apparatus (2) further comprises a heat pump ice crystal cold storage/water heat storage system;
the heat pump ice crystal cold storage/water heat storage system comprises a water source heat pump unit (117), an energy tower (147), an energy reservoir (239), the air-conditioning output circulating pump (52) and the heating air-conditioning system (4);
the water source heat pump unit (117) comprises a refrigeration compressor (118), a condenser/evaporator (119), an expansion valve (122), an evaporator/condenser (133) and a four-way reversing valve (123);
the energy tower (147) comprises a tower fan (150), a spraying apparatus (149), an air inlet (151) and an anti-freezing solution/water (148);
the energy reservoir (239) comprises a coil primary heat exchanger (240), a coil secondary heat exchanger (241) and energy storage water (243);
one end of the coil primary heat exchanger (240) in the energy reservoir (239) is connected to one end of the water heat exchange side (120) of the condenser/evaporator (119) through a coupled circulating tank (112); and
the other end of the water heat exchange side (120) of the condenser/evaporator (119) is connected to the other end of the coil primary heat exchanger (240) in the energy reservoir (239) through the coupled circulating pump (114), an air exhaust end of the refrigeration compressor (118) of the water source heat pump unit (117) passes through a four-way reversing valve (128) through an interface (124) of the four-way reversing valve and is connected to one end of a refrigerating agent heat exchange side (121) of the condenser/evaporator (119) through an interface (125) of the four-way reversing valve, the other end of the refrigerating agent heat exchange side (121) of the condenser/evaporator (119) is connected to one end of a refrigerating agent heat exchange side (134) of the evaporator/condenser (133) through the expansion valve (122), the other end of the refrigerating agent heat exchange side (134) of the evaporator/condenser (133) passes through a four-way reversing valve (129) through an interface (127) of the four-way reversing valve and is connected to an air suction end of the refrigeration compressor (118) through an interface (126) of the four-way reversing valve, one end of a water heat exchange side (135) of the evaporator/condenser (133) is connected to the spraying apparatus (149) of the energy tower (147), and the other end of the water heat exchange side (135) of the evaporator/condenser (133) is connected to the energy tower (147) through a water source circulating pump (136) and communicated with the anti-freezing solution/water (148) in the energy tower (147).

12. The photovoltaic energy storage power station according to claim 11, wherein the electric energy storage apparatus (2) further comprises a closed energy tower heat pump ice crystal cold storage/water heat storage system;
the closed energy tower heat pump ice crystal cold storage/water heat storage system further comprises a closed energy tower (154) and a spraying pump (162);
the closed energy tower (154) comprises a tower spraying pump (162), at least one set of coil heat exchangers (155), a spraying apparatus (157) and an anti-freezing solution/water (165);
a bottom portion of the closed energy tower (154) is provided with an anti-freezing solution/water reservoir (164), one end of the tower spraying pump (162) is connected to the anti-freezing solution/water reservoir (164) and communicated with the anti-freezing solution/water (165), and the other end of the tower spraying pump (162) is connected to the spraying apparatus (157) and communicated with an anti-freezing solution or water (159) in the spraying apparatus (157); and
the closed tower fan (158) is arranged a above the spraying apparatus (157), the spraying apparatus (157) is arranged below the closed tower fan (158) and arranged above the coil heat exchanger (155), a lower portion of the coil heat exchanger (155) is arranged at an upper portion of the anti-freezing solution/water reservoir (164) and arranged above a liquid level of the anti-freezing solution/water (165), and air horizontally enters the closed energy tower (154) only through an outer surface of the coil heat exchanger (155) and is exhausted out of the closed energy tower (154) through the closed tower fan (158).

13. The photovoltaic energy storage power station according to claim 12, wherein the electric energy storage apparatus (2) further comprises a closed tower heat pump ice crystal cold storage/water heat storage system;
the closed energy tower heat pump ice crystal cold storage/water heat storage system further comprises a closed energy tower (171) and the spraying pump (162);
the closed energy tower (171) comprises the tower spraying pump (162), the anti-freezing solution/water reservoir (164), the coil heat exchanger (172), the spraying apparatus (157), the closed tower fan (158) and a tower filler (173);
a bottom portion of the closed energy tower (171) is provided with the anti-freezing solution/water reservoir (164), one end of the tower spraying pump (162) is connected to the anti-freezing solution/water reservoir (164) and communicated with the anti-freezing solution/water (165), and the other end of the tower spraying pump (162) is connected to the spraying apparatus (157) and communicated with the anti-freezing solution/water (159) in the spraying apparatus (157); and the closed tower fan (158) is arranged at an upper portion of the spraying apparatus (157), the spraying apparatus (157) is arranged between the closed tower fan (158) and the coil heat exchanger (172) and arranged above the coil heat exchanger (172), a lower portion of the coil heat exchanger (172) is arranged at an upper portion of the tower filler (173), a lower portion of the tower filler (173) is arranged at the upper portion of the anti-freezing solution/water reservoir (164) and arranged on above the liquid level of the anti-freezing solution/water (165), and air horizontally enters the closed energy tower (171) only through the tower filler (173) and passes through the coil heat exchanger (172), and is exhausted out of the closed energy tower (171) through the closed tower fan (158), and a low portion of that tower filler (173) is arranged at the upper portion of the anti-freezing solution/water reservoir (164) and arranged above the liquid level of the anti-freezing solution/water (165).

14. The photovoltaic energy storage power station according to claim 12, wherein the electric energy storage apparatus (2) further comprises a primary heat exchange closed energy tower heat pump ice crystal cold storage/water heat storage system;

the primary heat exchange closed energy tower heat pump ice crystal cold storage/water heat storage system comprises a heat pump unit (246) and a gas-liquid separator (243); and the heat pump unit (246) is connected to the interface (126) of the four-way reversing valve through an air inlet interface (244) of the gas-liquid separator (243), an air exhaust interface (245) of the gas-liquid separator (243) is connected to the air suction end of the refrigeration compressor (118), the interface (127) of the four-way reversing valve is connected to one end of the coil heat exchanger (155), the other end of the coil heat exchanger (155) is connected to one end of the refrigerating agent heat exchange side (121) of the condenser/evaporator (119) through the expansion valve (122), and the other end of the refrigerating agent heat exchange side (121) of the condenser/evaporator (119) is connected to the interface (125) of the four-way reversing valve.

15. The photovoltaic energy storage power station according to claim 13, wherein the electric energy storage apparatus (2) further comprises the primary heat exchange closed energy tower heat pump ice crystal cold storage/water heat storage system;

the primary heat exchange closed energy tower heat pump ice crystal cold storage/water heat storage system comprises the heat pump unit (246) and the gas-liquid separator (243); and one end of the coil heat exchanger (172) is connected to the interface (127) of the four-way reversing valve, the other end of the coil heat exchanger (172) is connected to one end of the refrigerating agent heat exchange side (121) of the condenser/evaporator (119) through the expansion valve (122), and the other end of the refrigerating agent heat exchange side (121) of the condenser/evaporator (119) is connected to the interface (125) of the four-way reversing valve.

16. The photovoltaic energy storage power station according to claim 11, further comprising a second-stage pump unit (248);

the second-stage pump unit (248) comprises a second compressor (251), a condenser (252), a second expansion valve (255), an evaporator (256), and single and double-stage changeover valves (249, 250, 259, 260, 261 and 262); and one end of the single and double-stage changeover valve (250) is respectively connected to one end of the water heat exchange side (120) of the condenser/evaporator (119) of the heat pump unit (117) and one end of the single and double-stage changeover valve (260), the other end of the water heat exchange side (120) of the condenser/evaporator (119) of the heat pump unit (117) is respectively connected to one end of the single and double-stage changeover valve (249) and one end of the single and double-stage changeover valve (261), the other end of the single and double-stage changeover valve (250) is connected to one end of a water heat exchange side (258) of the evaporator (256) of the second-stage pump unit (248) through the output circulating pump (114), the other end of the water heat exchange side (258) of the evaporator (256) of the second-stage pump unit (248) is connected to the other end of the single and double-stage changeover valve (249), one end of a refrigerating agent heat exchange side (257) of the evaporator (256) of the second-stage pump unit (248) is connected to an air suction end of the second refrigeration compressor (251), the other end of the refrigerating agent heat exchange side (257) of the evaporator (256) of the second-stage pump unit (248) is connected to one end of a refrigerating agent heat exchange side (253) of the condenser (252) through the second expansion valve (255), the other end of the refrigerating agent heat exchange side (253) of the condenser (252) is connected to an air exhaust end of the second refrigeration compressor (251), one end of a water heat exchange side (254) of the condenser (252) is respectively connected to the other end of the single and double-stage changeover valve (260) and one end of the circulating pump (114) through one end of the single and double-stage changeover valve (259), the other end of the circulating pump (114) is connected to one end of a freezing coil heat exchanger (240), the other end of the freezing coil heat exchanger (240) is respectively connected to one end of the single and double-stage changeover valve (262) and the other end of the single and double-stage changeover valve (261) through the coupled circulating tank (112), the other end of the single and double-stage changeover valve (262) is connected to one end of a water heat exchange side (254) of the condenser (252) of the second-stage pump unit (248), and the other end of the water heat exchange side (254) of the condenser (252) of the second-stage pump unit (248) is connected to the other end of the single and double-stage changeover valve (259).

17. The photovoltaic energy storage power station according to claim 11, further comprising a configured integrated machine room (263), the refrigeration unit (95), the heat pump unit (117), the heat pump unit (246), the second-stage pump unit (248), a configured power distribution apparatus (194), a detection automatic control apparatus (196), a remote monitoring apparatus (198), the cooling tower (104), the energy tower (147), the closed energy tower (154) and the closed energy tower (171);

the refrigeration unit (95), the heat pump unit (117), the heat pump unit (246), the second-stage pump unit (248), the power distribution apparatus (194), the detection automatic control apparatus (196) and the remote monitoring apparatus (198) are all configured in the integrated machine room (263) and integrally manufactured by a factory;

the power distribution apparatus (194) comprises a power distribution cabinet (195), an input end of the power distribution cabinet (195) is connected to three-phase power A, B and C of the wind and photovoltaic power grid (1) through power interfaces (190, 191, 192 and 193), and an output end of the power distribution cabinet (195) is connected to a power input end of an electric device in the integrated machine room (263);

the detection automatic control apparatus (196) comprises a detection and/or automatic control cabinet (197), and the detection and/or automatic control cabinet (197) is connected to a detection and control device end needed in the integrated machine room (263);

the remote monitoring apparatus (198) comprises a mobile communication 3G or 4G or 5G or wireless local area network remote monitoring apparatus (199), and the mobile communication 3G or 4G or 5G or wireless local area network remote monitoring apparatus (199) is connected to the detection and/or automatic control cabinet (197) in the integrated machine room (263); and the cooling tower (104) or the energy tower (147) or the closed energy tower (154) or the closed energy tower (171) is arranged at one side of the integrated machine room (263) or above the integrated machine room (263), and is integrally assembled and manufactured by the factory.

\* \* \* \* \*